United States Patent
Lucas et al.

(10) Patent No.: US 11,412,036 B2
(45) Date of Patent: Aug. 9, 2022

(54) METHODS, APPARATUSES AND COMPUTER PROGRAM PRODUCTS FOR MANAGING PRODUCT FEATURE RELEASE IN A CLOUD-BASED COMPUTING ENVIRONMENT

(71) Applicants: ATLASSIAN PTY LTD, Sydney (AU); ATLASSIAN INC, San Francisco, CA (US)

(72) Inventors: Diogo Correa Lucas, Santa Clara, CA (US); Chetan Ithal, Sunnyvale, CA (US); Ching Lee, Mountain View, CA (US); Alex Riegelman, Sydney (AU); Gurik Sidhu, San Francisco, CA (US)

(73) Assignees: ATLASSIAN PTY LTD, Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 16/948,636

(22) Filed: Sep. 25, 2020

(65) Prior Publication Data

US 2022/0103621 A1 Mar. 31, 2022

(51) Int. Cl.
| | |
|---|---|
| *H04L 12/00* | (2006.01) |
| *H04L 67/1036* | (2022.01) |
| *G06F 16/9035* | (2019.01) |
| *G06F 16/907* | (2019.01) |
| *H04L 67/1008* | (2022.01) |

(52) U.S. Cl.
CPC ........ *H04L 67/1036* (2013.01); *G06F 16/907* (2019.01); *G06F 16/9035* (2019.01); *H04L 67/1008* (2013.01)

(58) Field of Classification Search
CPC ............. H04L 67/1013; H04L 67/1036; H04L 67/1008; G06F 16/9035; G06F 16/907
USPC .......................................... 709/226, 225, 227
See application file for complete search history.

(56) References Cited

U.S. PATENT DOCUMENTS

| | | | | |
|---|---|---|---|---|
| 5,950,209 | A * | 9/1999 | Carrier, III | G06F 8/71 |
| 8,132,266 | B2 * | 3/2012 | Goudreau | G06F 21/629 726/31 |
| 9,734,169 | B2 * | 8/2017 | Redlich | G06Q 10/10 |
| 10,511,589 | B2 * | 12/2019 | Gangawane | H04L 63/10 |
| 10,530,578 | B2 * | 1/2020 | Keshava | G06F 12/1466 |

(Continued)

OTHER PUBLICATIONS

LaunchDarkly "Manage Features at Any Scale", [Retrieved on Aug. 25, 2020], <URL:http://launchdarkly.com>, Feature Flag & Toggle Management, dated Aug. 25, 2020.

*Primary Examiner* — Frantz Coby
(74) *Attorney, Agent, or Firm* — Alston & Bird LLP

(57) ABSTRACT

Various embodiments herein described are directed to methods, apparatuses and computer program products configured for managing software product feature and version releases in complex and distributed network systems. Various embodiments are directed to systems and network frameworks that are configured to provide controlled release of software features/changes through admin user notification and control interfaces. In some embodiments, a sandbox system environment may be provided to admin users to test and configure upcoming software features/changes. Additional example embodiments provide a release track system that specifies and manages feature release schedules in a complex and multitenant cloud network environment.

20 Claims, 12 Drawing Sheets

(56) References Cited

U.S. PATENT DOCUMENTS

| | | | |
|---|---|---|---|
| 10,579,367 B2* | 3/2020 | Lander | H04L 45/02 |
| 10,581,820 B2* | 3/2020 | Keshava | H04L 9/0894 |
| 10,705,823 B2* | 7/2020 | Pitre | H04L 67/10 |
| 10,728,742 B2* | 7/2020 | Van Der Velde | H04L 5/0048 |
| 10,846,390 B2* | 11/2020 | Subramanian | G06F 16/86 |
| 2005/0071273 A1* | 3/2005 | Vroman | G06Q 30/06 |
| | | | 705/51 |
| 2007/0240233 A1* | 10/2007 | Goudreau | G06F 21/629 |
| | | | 726/31 |
| 2015/0178050 A1* | 6/2015 | Said | G06Q 10/06 |
| | | | 717/106 |
| 2016/0378435 A1* | 12/2016 | Danielson | G06F 40/263 |
| | | | 717/104 |
| 2018/0279116 A1* | 9/2018 | Van Der Velde | G06F 8/65 |
| 2019/0097825 A1* | 3/2019 | Kan | H04L 12/1895 |

* cited by examiner

METHODS, APPARATUSES AND COMPUTER PROGRAM PRODUCTS FOR MANAGING PRODUCT FEATURE RELEASE IN A CLOUD-BASED COMPUTING ENVIRONMENT

BACKGROUND

Applicant has identified many deficiencies and problems associated with software feature and version release protocols in complex and distributed network systems. Through applied effort, ingenuity, and innovation, one or more of these deficiencies and problems have been solved by developing solutions that are included in embodiments of the present disclosure, various examples of which are described in detail herein.

BRIEF SUMMARY

In general, embodiments of the present disclosure provide methods, apparatus, systems, computing devices, and/or the like for managing software product feature release in a cloud-based computing environment.

In accordance with various example embodiments of the present disclosure, an apparatus for managing feature release in a cloud-based computing environment is provided. The apparatus comprises at least one processor and at least one non-transitory memory comprising program code, the at least one non-transitory memory and the program code configured to, with the at least one processor, cause the apparatus to at least: retrieve feature release data objects from a feature release data repository, each of the feature release data objects comprising feature metadata and release metadata corresponding to the feature metadata; select a subset of the feature release data objects based at least in part on release metadata of each feature release data object in the subset of the feature release data objects indicating a release time between a previous feature bundle generation time and a current time, the previous feature bundle generation time being associated with a scheduled release track subscription; generate a feature bundle data object based at least in part on feature metadata of each feature release data object in the subset of the feature release data objects; and transmit the feature bundle data object to a first client device associated with the scheduled release track subscription at a subsequent feature bundle release time associated with the scheduled release track subscription.

In some embodiments, each of the feature release data objects further comprises status metadata, wherein selecting the subset of the feature release data objects is further based at least in part on status metadata of each feature release data object in the subset of the feature release data objects indicating a launching state.

In some embodiments, each of the feature release data objects further comprises feature toggle metadata, wherein selecting the subset of the feature release data objects is further based at least in part on feature toggle metadata of each feature release data object in the subset of the feature release data objects indicating an ON state.

In some embodiments, each of the feature release data objects further comprises category metadata, wherein selecting the subset of the feature release data objects is further based at least in part on category metadata of each feature release data object in the subset of the feature release data objects indicating a predetermined category.

In some embodiments, each of the feature release data objects further comprises documentation metadata corresponding to the feature metadata.

In some embodiments, selecting the subset of the feature release data objects is further based at least in part on documentation metadata of each feature release data object in the subset of the feature release data objects indicating a filled state.

In some embodiments, prior to transmitting the feature bundle data object to the first client device, the at least one non-transitory memory and the program code are configured to, with the at least one processor, cause the apparatus to further: generate a feature bundle notification based at least in part on the subsequent feature bundle release time and the documentation metadata of each feature release data object in the subset of the feature release data objects; and prior to the subsequent feature bundle release time, transmit the feature bundle notification to the first client device.

In some embodiments, the first client device is associated with a first user profile, wherein the first user profile is associated with a first organization identifier and a first admin user identifier, wherein, prior to generating the feature bundle notification, the at least one non-transitory memory and the program code are configured to, with the at least one processor, cause the apparatus to further: receive, from the first client device, a scheduled release track subscription request indicating the first organization identifier and a product identifier; retrieve, from a client data repository, a second user profile associated with the first organization identifier, the product identifier, and a non-admin user identifier; and update the second user profile to indicate the scheduled release track subscription associated with the product identifier.

In some embodiments, the feature bundle data object comprises product metadata corresponding to the product identifier, wherein, subsequent to transmitting the feature bundle notification to the first client device, the at least one non-transitory memory and the program code are configured to, with the at least one processor, cause the apparatus to further: receive, from the first client device, an approval indication in response to the feature bundle notification; and in response to receiving the approval indication, transmit the feature bundle data object to a second client device associated with the second user profile.

In some embodiments, the at least one non-transitory memory and the program code are configured to, with the at least one processor, cause the apparatus to further: receive input indicating second feature metadata and feature toggle metadata corresponding to the second feature metadata; and generate a second feature release data object based at least in part on the second feature metadata and the feature toggle metadata.

In some embodiments, the at least one non-transitory memory and the program code are configured to, with the at least one processor, cause the apparatus to further: in response to determining that the feature toggle metadata indicates an ON state: add a segment rule to the second feature release data object; and transmit the second feature metadata to a second client device associated with a continuous release track subscription.

In some embodiments, the at least one non-transitory memory and the program code are configured to, with the at least one processor, cause the apparatus to further: subsequent to transmitting the second feature metadata, remove the segment rule from the second feature release data object.

In some embodiments, the feature bundle data object comprises the second feature metadata, wherein the at least one non-transitory memory and the program code are configured to, with the at least one processor, cause the apparatus to further: prior to transmitting the feature bundle data object, receive a rollback request associated with the second feature metadata; and remove the second feature metadata from the feature bundle data object.

In some embodiments, the feature bundle data object comprises the second feature metadata, wherein the at least one non-transitory memory and the program code are configured to, with the at least one processor, cause the apparatus to further: subsequent to transmitting the feature bundle data object, receive a rollback request associate with the second feature metadata; and adjust the feature toggle metadata corresponding to the second feature metadata to an OFF state.

In accordance with various example embodiments of the present disclosure, a computer-implemented method for managing feature release in a cloud-based computing environment is provided. The computer-implemented method comprises: retrieving feature release data objects from a feature release data repository, each of the feature release data objects comprising feature metadata and release metadata corresponding to the feature metadata; selecting a subset of the feature release data objects based at least in part on release metadata of each feature release data object in the subset of the feature release data objects indicating a release time between a previous feature bundle generation time and a current time, the previous feature bundle generation time being associated with a scheduled release track subscription; generating a feature bundle data object based at least in part on feature metadata of each feature release data object in the subset of the feature release data objects; and transmitting the feature bundle data object to a first client device associated with the scheduled release track subscription at a subsequent feature bundle release time associated with the scheduled release track subscription.

In accordance with various example embodiments of the present disclosure, a computer program product for managing feature release in a cloud-based computing environment is provided. The computer program product comprises at least one non-transitory computer-readable storage medium having computer-readable program code portions stored therein, the computer-readable program code portions comprising an executable portion configured to: retrieve feature release data objects from a feature release data repository, each of the feature release data objects comprising feature metadata and release metadata corresponding to the feature metadata; select a subset of the feature release data objects based at least in part on release metadata of each feature release data object in the subset of the feature release data objects indicating a release time between a previous feature bundle generation time and a current time, the previous feature bundle generation time being associated with a scheduled release track subscription; generate a feature bundle data object based at least in part on feature metadata of each feature release data object in the subset of the feature release data objects; and transmit the feature bundle data object to a first client device associated with the scheduled release track subscription at a subsequent feature bundle release time associated with the scheduled release track subscription.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
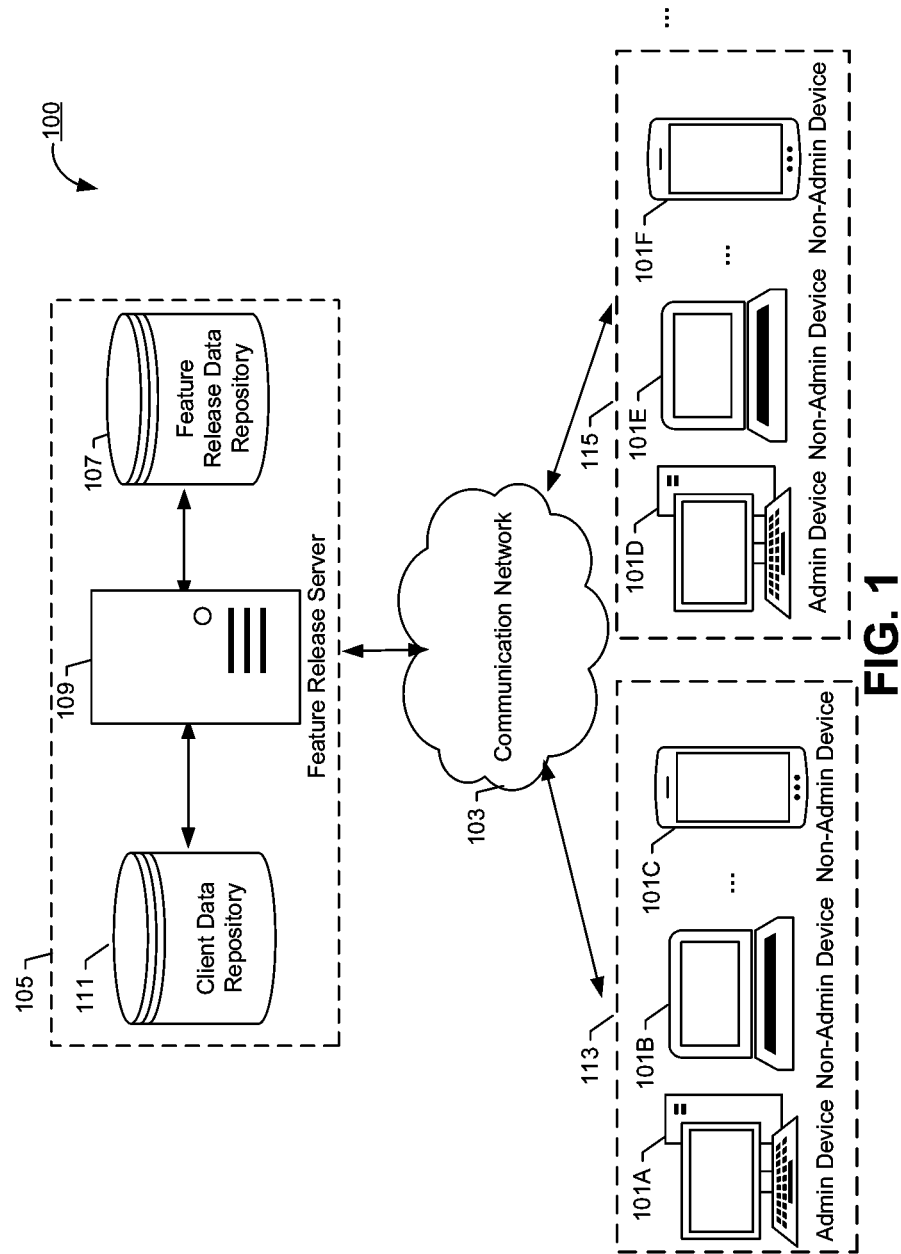
Figure 2:
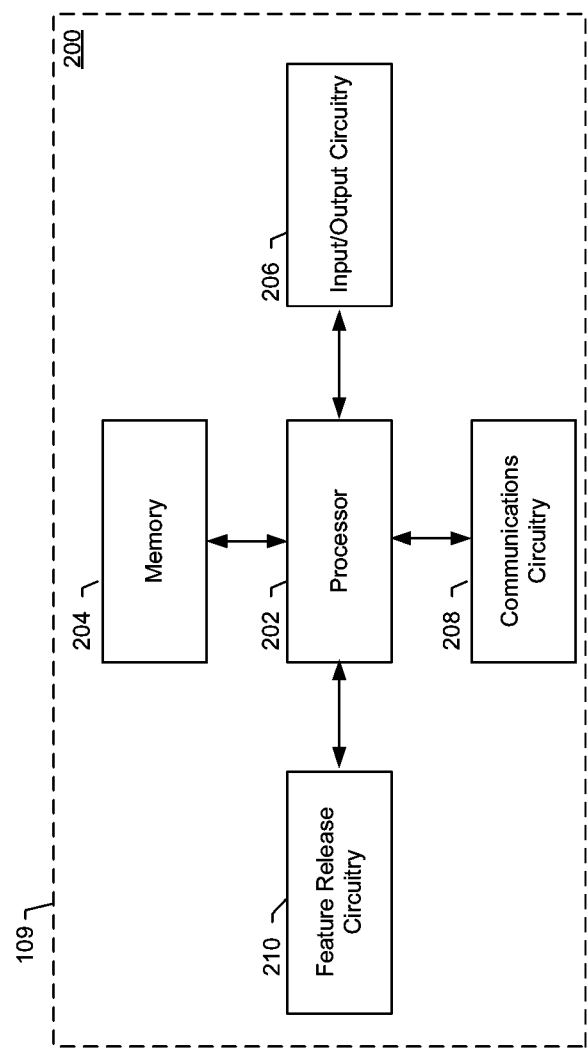
Figure 3:
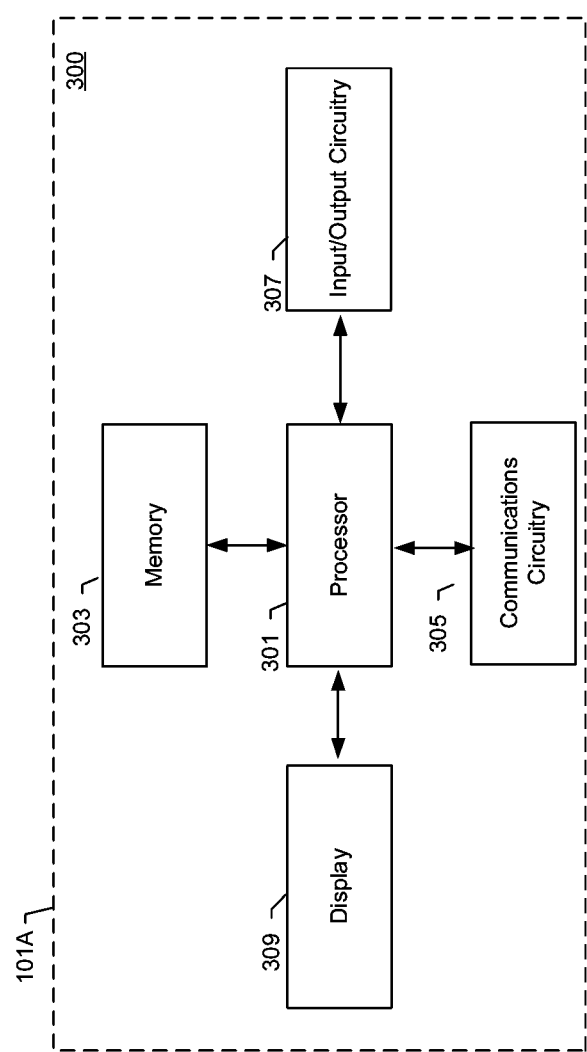
Figure 4:
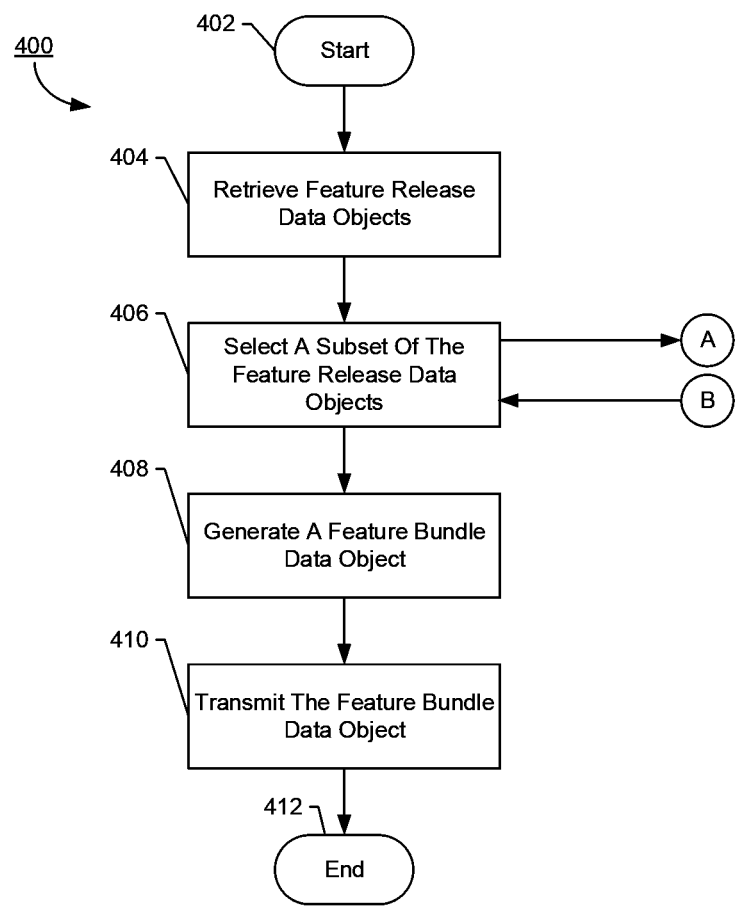
Figure 5:
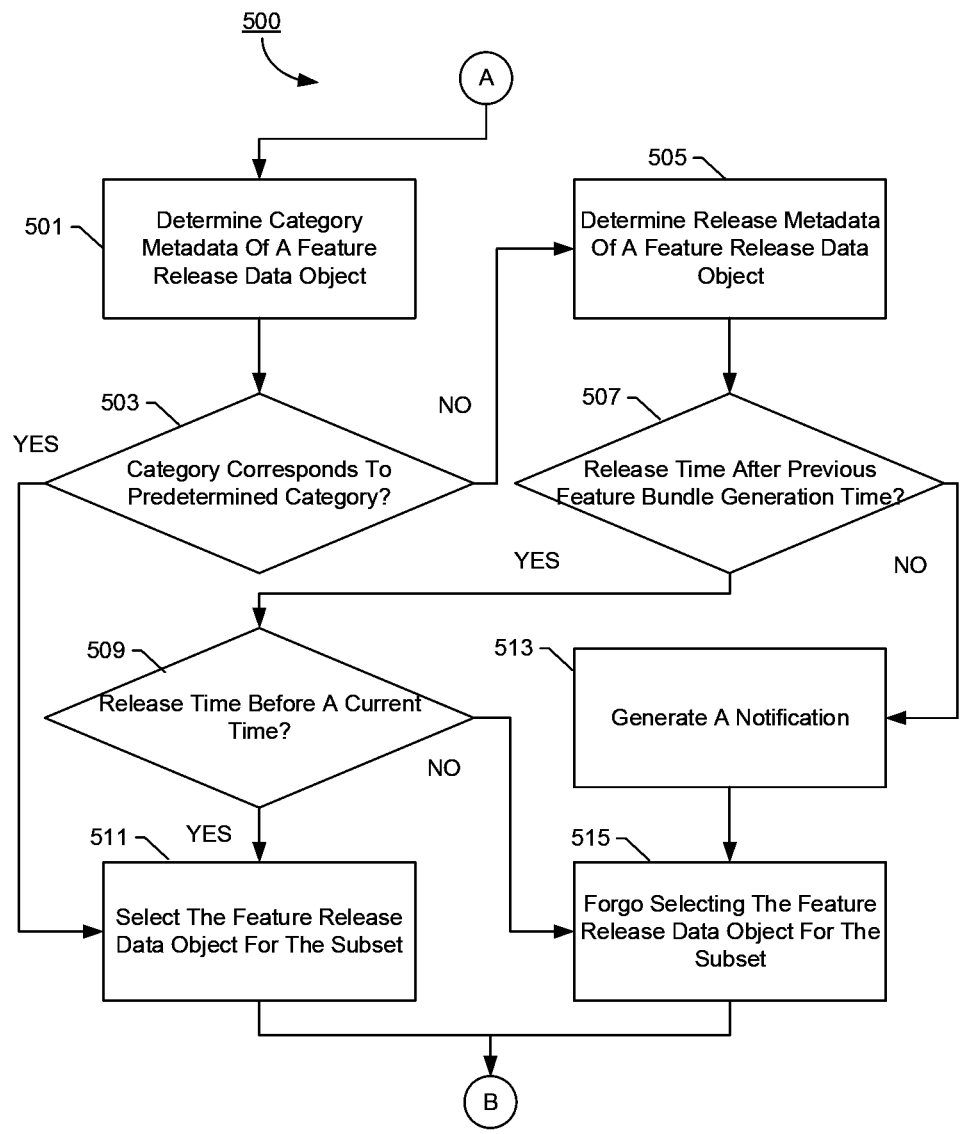
Figure 6:
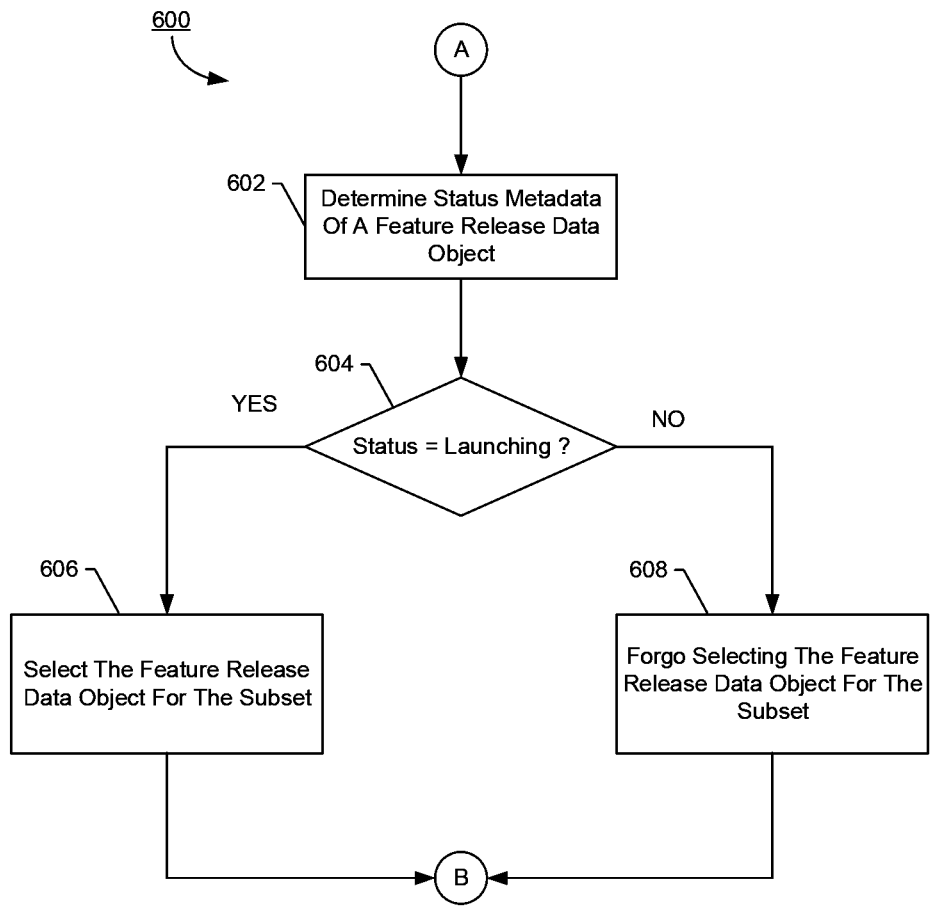
Figure 7:
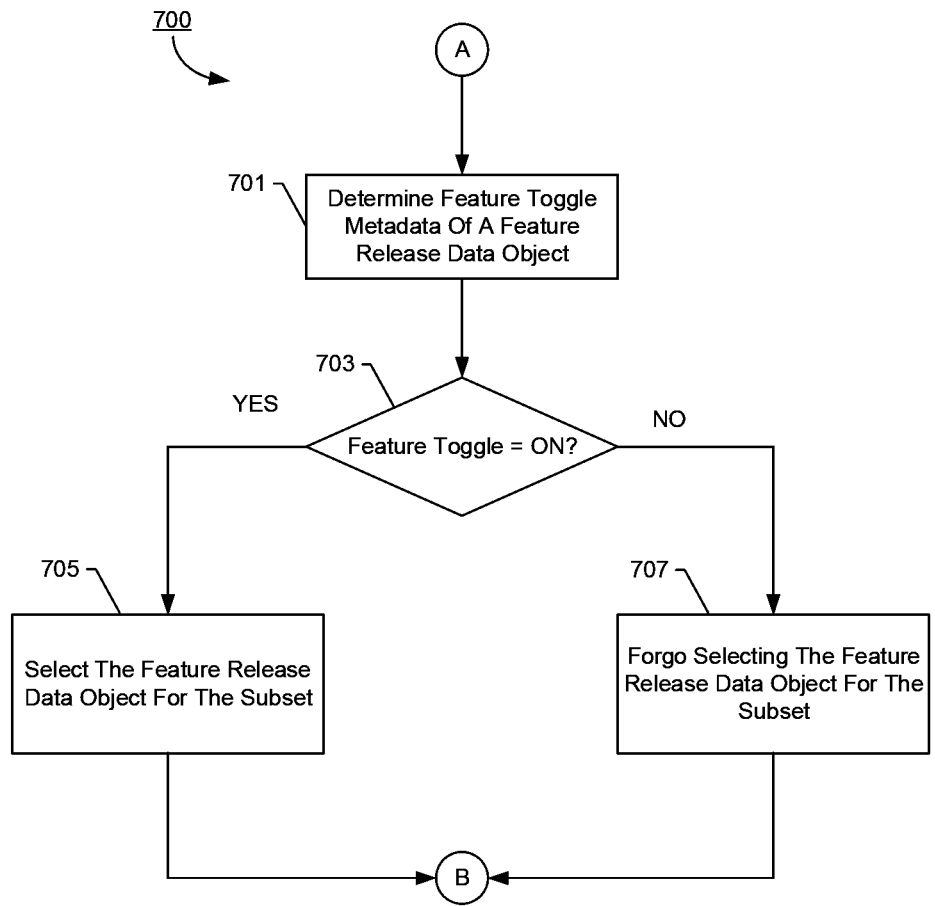
Figure 8:
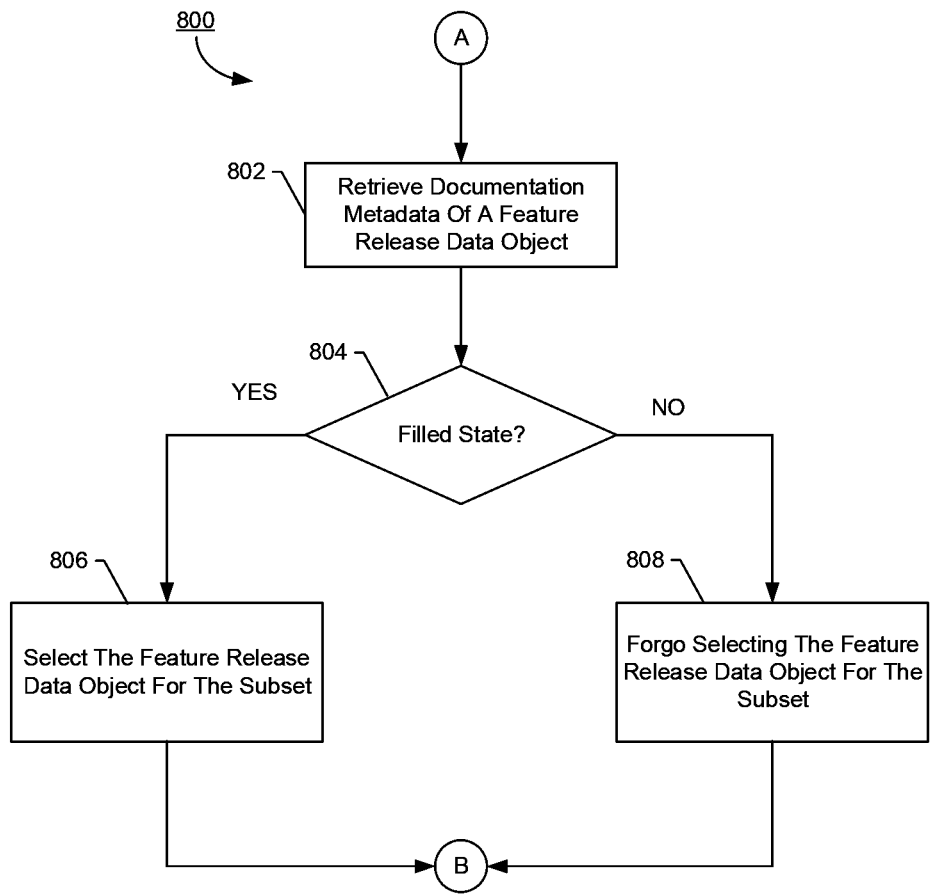
Figure 9:
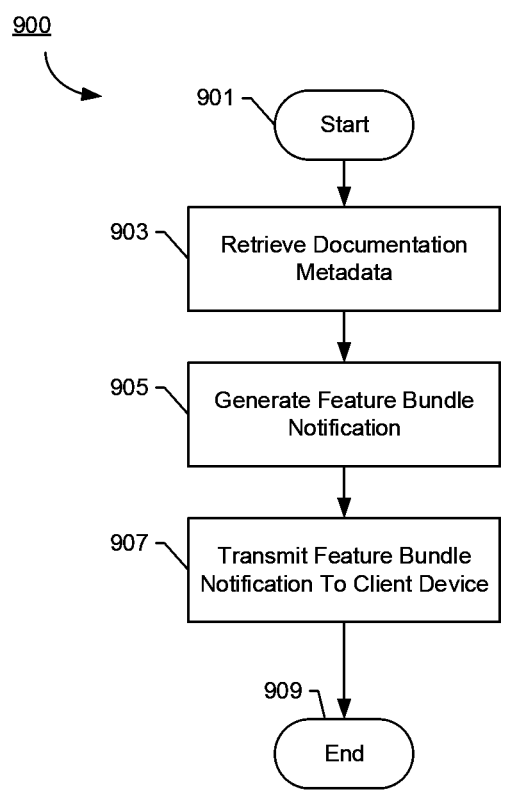
Figure 10:
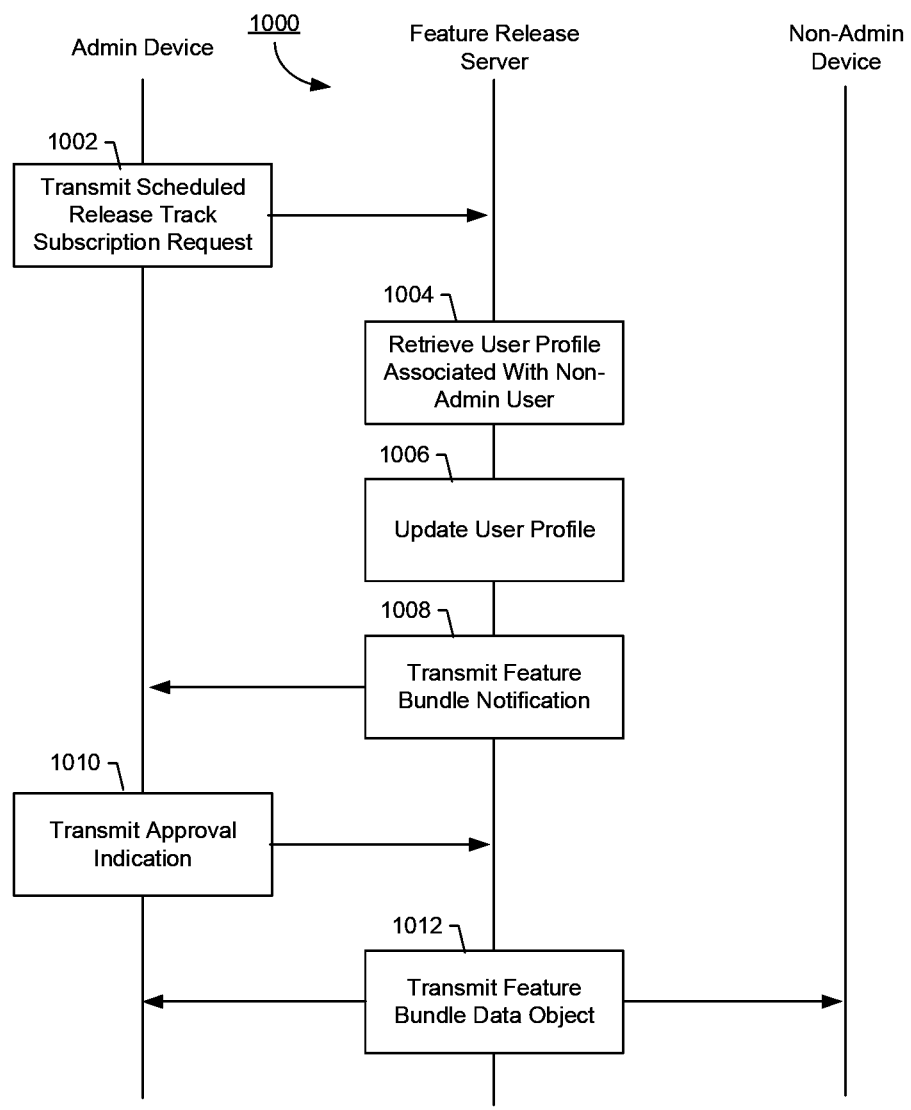
Figure 11:
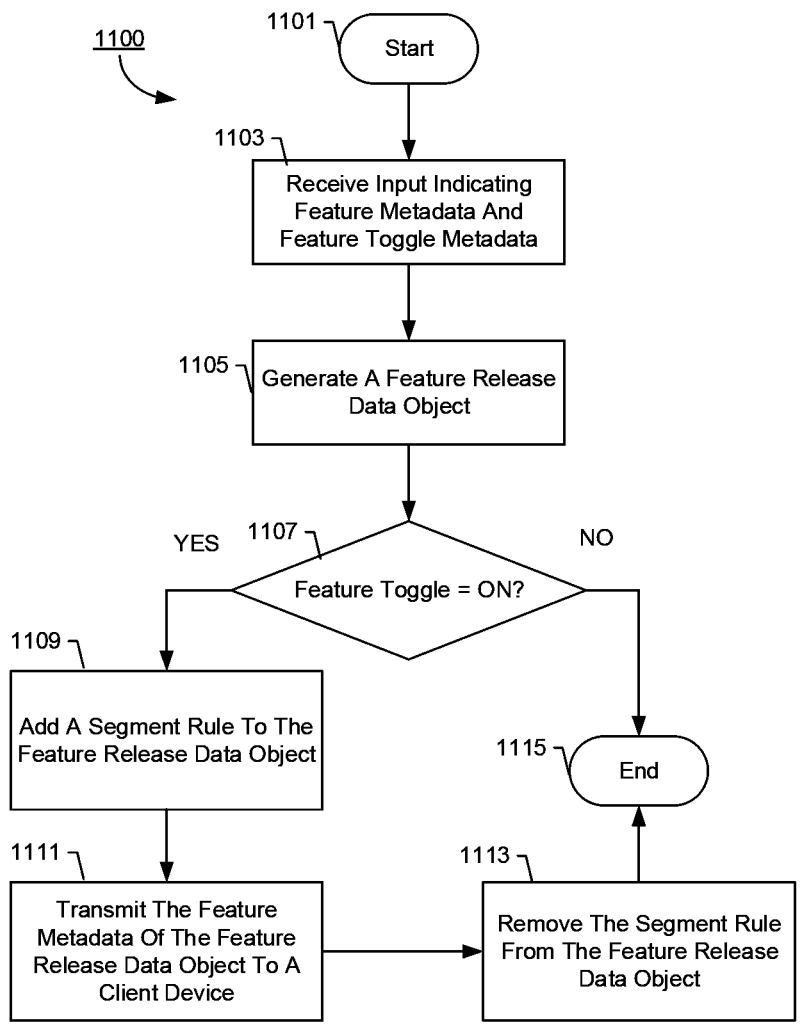
Figure 12:
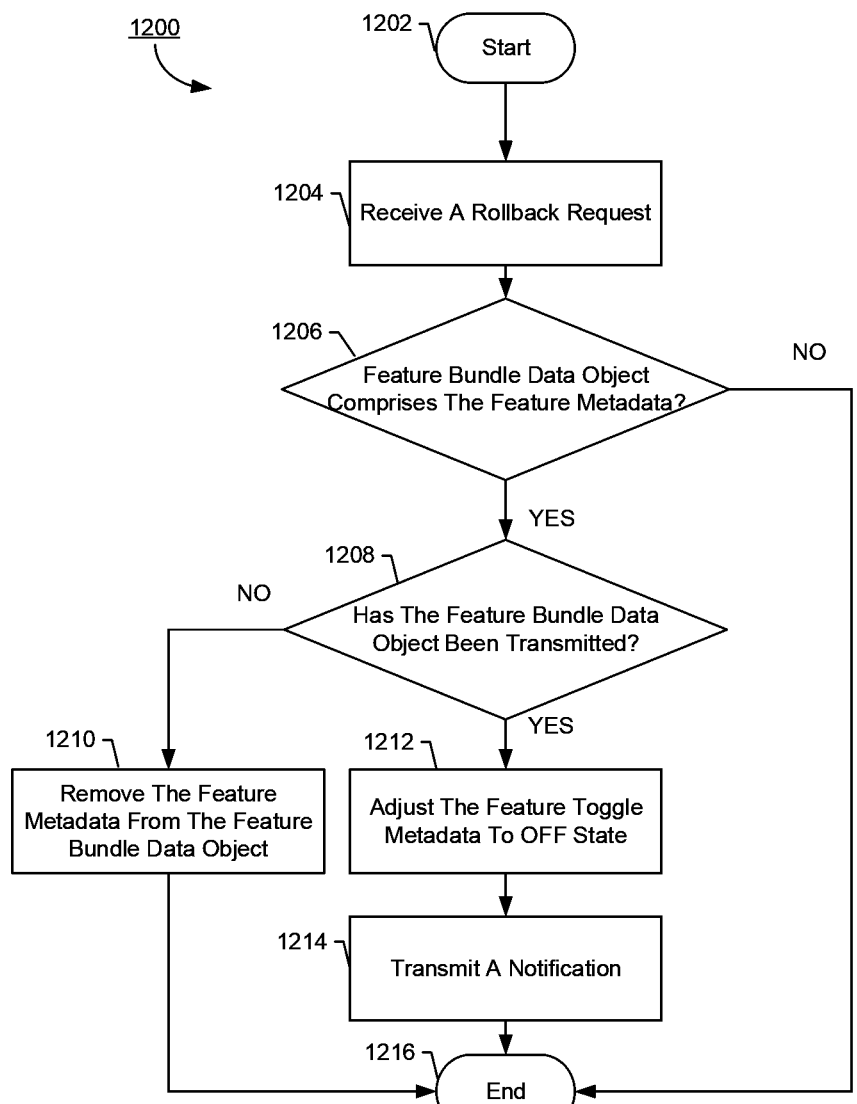

Having thus described some embodiments in general terms, references will now be made to the accompanying drawings, which are not necessarily drawn to scale, and wherein:

FIG. 1 is an example system architecture diagram illustrating an example feature release server in communication with other devices (such as client devices) in accordance with some embodiments of the present disclosure;

FIG. 2 is an example infrastructure diagram illustrating an example computing device (for example, an example feature release server) in accordance with some embodiments of the present disclosure;

FIG. 3 is an example infrastructure diagram illustrating an example computing device (for example, an example client device) in accordance with some embodiments of the present disclosure;

FIG. 4 is an example flowchart illustrating an example method for managing feature release in accordance with some embodiments of the present disclosure;

FIG. 5 is an example flowchart illustrating an example method for selecting a subset of feature release data objects in accordance with some embodiments of the present disclosure;

FIG. 6 is an example flowchart illustrating an example method for selecting a subset of feature release data objects in accordance with some embodiments of the present disclosure;

FIG. 7 is an example flowchart illustrating an example method for selecting a subset of feature release data objects in accordance with some embodiments of the present disclosure;

FIG. 8 is an example flowchart illustrating an example method for selecting a subset of feature release data objects in accordance with some embodiments of the present disclosure;

FIG. 9 is an example flowchart illustrating an example method associated with generating and transmitting a feature bundle notification in accordance with some embodiments of the present disclosure;

FIG. 10 is an example signal diagram illustrating example communications between an admin device, a feature release server, and a non-admin device in accordance with some embodiments of the present disclosure;

FIG. 11 is an example flowchart illustrating an example method associated with handling feature release in accordance with some embodiments of the present disclosure; and FIG. 12 is an example flowchart illustrating an example method associated with handling rollback requests in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to managing software product feature and version releases in complex and distributed network systems. More specifically, various embodiments of the present disclosure are related to providing a feature release framework or a feature release track system that is configured for notifying end users of a software product release, notifying end users of upcoming new feature releases for the software product, and/or enabling end users to control/customize when, or if, to receive the new feature releases.

Software products (also referred to herein simply as "products" include, without limitation, application software, system software, and/or firmware) and features associated with software products (such as, but not limited to, a software patch that fixes vulnerabilities associated with the product, a software update that expands functionalities of the software) may be deployed from one or more central computing devices (for example, one or more servers) to one or more remote computing devices (for example, one or more client devices), so that products and features associated with products may be available for use by end users via the remote computing devices.

For example, a product developer (such as a software developer) may design, create, and/or develop a product and/or one or more features associated with such product through operating a computing device in communication with one or more servers. The one or more servers may store (locally and/or via one or more remote databases) the product and/or the features designed, created, and/or developed by the product developer. The one or more servers may release the product and/or features associated with the product to end users of the product (for example, users who have purchased or subscribed to the product).

From the end users' perspective, the release of products and/or features encompass activities and operations that transfer products and/or features from the server to the end user's computing devices. Subsequently, the transferred products and/or features may be installed and/or activated in the end users' computing devices, such that these products and/or features may be ready for use by the end users' computing devices.

However, end users may sometimes be "blindsided" by the release of products and features. As an example, features associated with a product may be continuously rolled out to end users, and end users may not know what features will be rolled out and/or when features will be rolled out. The lack of awareness and control by end users concerning feature release content and timing (and the lack of opportunity for the software release platform to accommodate user trials of the released features before they are rolled out) may create considerable technical difficulties particularly in complex and highly customized network systems. For example, end users may operate computing devices that are specially configured based on security or other constraints to be rendered incompatible with one or more features that are intended for roll out. In this example, on or more released features may cause these computing devices to crash or become inoperable. As another example, features associated with a software application may be released to the end users' computing devices while the software application is in a runtime state, which may cause the software application to exit unexpectedly. Such unexpected exits or shutdowns can result in loss of data and a general compromise of software or system integrity.

End users may be associated with different organizations and each organization may have an admin user who is charged with managing an organization network and all organization and user computing devices operating thereon. The responsibilities and urgent demands placed on admin users may cause additional technical complexities in managing product feature releases. As an example, an admin user, Alice, of Advent Corporation ("Advent") may manage computing devices of other end users of Advent (for example, a non-admin user Brandon), which may include managing subscriptions to a software application, Ace Software ("Ace"). In this example, installation of new features associated with Ace on Brandon's computing device may require approval from Alice. However, any approval by Alice may be undesirably bypassed in a network environment where new features are continuously rolled out by Ace to Brandon's computing device. This may create security vulnerabilities (for example, when the new feature exploits or exposes a weakness in Advent's network system) or may cause device performance degradations or outright inoperability (for example, when a new feature conflicts with custom device or security settings or other software applications used on Advent devices).

Example embodiments of the present disclosure may overcome the above-referenced technical challenges while providing various technical benefits. For example, various embodiments of the present disclosure may provide controlled release of features/changes through notification and messaging to admin users about upcoming features/changes. In some embodiments, a sandbox system environment may be provided to the admin users to test out upcoming features/changes. Additionally, example embodiments of the present disclosure may provide a release track system that specifies when a feature will be released (for example, a release frequency of new features). As such, systems structured in accordance with various embodiments of the invention provide specific, technical solutions to technical problems faced by existing systems, the details of which are described hereinafter.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the term "set" or "subset" refers to a collection of zero or more elements.

The term "cloud-based computing environment" or "cloud-based computing system" refers to a software platform and associated hardware that are configured to support and maintain data exchange between and among various computing devices, such as, but not limited to, a feature release server, a feature release data repository, a client data repository, and/or one or more client devices. For example, the cloud-based computing environment may provide sufficient data security through its framework, structure, and/or data exchange channels, such that the one or more client devices may receive product(s), feature(s) and/or feature bundle data objects(s) associated with a product from the feature release server.

The term "product," "application," "application software," "app," or similar terms refer to a computer program or group of computer programs designed for use by and interaction with one or more local, networked or remote computing devices, such as, but not limited to, client devices. Examples of a product may include, but not limited to, project and issue tracking software, workflow engines, service desk incident management system, team collaboration suites, cloud services, word processors, spreadsheet generators, accounting applications, web browsers, email clients, media players, file viewers, videogames, photo/video editors, and/or the like. A product may be supported or supplemented by one or more features either via direct communication with the features (for example, in the cloud-based computing environment, locally on the client device, and/or the like) or indirectly by relying on a feature that is in turn supported by one or more other features.

The term "feature" refers to a functionality or a set of functionalities associated with a product, an application, an application software, and/or an app, such as, but not limited to, the retrieval of specified information or the execution of a set of operations. In some examples, different client devices may use and reuse one or more features for their respective purposes, while a central computing device (for example, a feature release server) may control the release, usage, and/or revocation of the one or more features. For example, a feature release server may control the timing of releasing one or more features to one or more client devices based on, such as but not limited to, a client profile of the client device (for example, a track subscription indicated by the client profile), details of which are described herein.

Additionally, or alternatively, a feature may support, or be supported by, at least one other feature via a feature dependency relationship. For example, a project and issue tracking software installed on a computing device may retrieve project and issue data stored at a server in order to render a user interface for displaying these data on the computing device. In such an example, the project and issue tracking software is dependent on the remote data retrieval feature to perform the rendering task. In some examples, a feature is offered by one computing device (for example, a feature release server) over a network to one or more other computing devices (for example, client devices). Additionally, or alternatively, the feature may be stored, offered, and utilized by a single computing device (for example, a client device) to local applications stored thereon, such that a network is not required.

In some examples, features may be accessed by other features via a plurality of Application Programming Interfaces (APIs), for example, based on JavaScript Object Notation (JSON), Extensible Markup Language (XML), Simple Object Access Protocol (SOAP), Hypertext Markup Language (HTML), and the like, or combinations thereof. In some examples, a feature can represent an operation with a specified outcome and can further be a self-contained software program.

The term "feature release server" refers to a software platform and associated hardware that is configured to manage the release of feature(s) and/or feature bundle data objects(s) associated with one or more products in the cloud-based computing environment and provide various functionalities as described below. The feature release server is configured to access, maintain, and support feature release logic of the cloud-based computing environment and to access one or more data repositories, such as a feature release data repository and/or a client data repository, details of which are described herein.

The term "feature release data repository" refers to a location where data associated with one or more products is stored, accessed, modified and otherwise maintained by the feature release server. The stored data includes information that facilitates the operation of the cloud-based computing environment, the feature release server and/or the one or more client devices. Such information may include, but is not limited to, feature release data objects, metadata associated with the feature release data objects (including, but not limited to, feature metadata, release metadata, documentation metadata, status metadata, etc.), feature bundle data object(s), product data associated with the cloud-based computing environment, and/or the like. The feature release data repository may be embodied as a data storage device or devices, as a separate database server or servers, or as a combination of data storage devices and separate database servers. Further, in some examples, the feature release data repository may be embodied as a distributed repository such that some of the stored data is stored centrally in a location within the cloud-based computing environment and other data is stored in a single remote location or a plurality of remote locations. Alternatively, in some examples, the feature release data repository may be distributed over a plurality of remote storage locations only.

The term "data object" refers to a data structure that represents one or more functionalities and/or characteristics associated with data and/or information. The term "feature release data object" refers to a data object that describes a collection of data items associated with one or more features of a product. In some examples, a feature release data object may be generated by a computing device (for example, a feature release server) in the cloud-based computing environment. In some examples, a feature release data object may be stored in a data repository (for example, a feature release data repository). In some examples, one or more feature release data objects may be transmitted to one or more client devices by the feature release server based on, for example, corresponding track subscriptions associated with the one or more client devices, details of which are described herein.

The term "feature bundle data object" refers to a collection of one or more feature release data objects and/or one or more metadata associated with one or more feature release data objects. For example, the feature bundle data object may include feature metadata of a plurality of feature release data objects, details of which are described herein.

In some examples, data items in an example feature release data object or an example feature bundle data object may include metadata. The term "metadata" refers to a parameter, a data field, a data element, or the like that describes an attribute of a data object. For example, a feature release data object or a feature bundle data object may include, but not limited to, feature metadata, release metadata, documentation metadata, status metadata, feature toggle metadata, product metadata, category metadata, and/or the like.

In some examples, feature metadata may describe one or more features associated with a feature release data object or a feature bundle data object. For example, the feature metadata may provide programming codes, computer instructions, source codes, and the like, which may enable a computing device (for example, a client device) to use and/or reuse one or more features of a product when the programming code, the computer instructions, and/or the source codes are deployed by the computing device.

In some examples, release metadata may describe a release time for enabling the client devices to receive, use and/or reuse such feature. For example, a software developer may define a time point for releasing a feature to one or more computing devices (associated with one or more end users) as the release time in the release metadata. In some examples, the release metadata may include text string(s), numerical character(s), alphabetical character(s), alphanumeric code(s), American Standard Code for Information Interchange (ASCII) character(s), and/or the like.

In some examples, the documentation metadata may include text string(s), numerical character(s), alphabetical character(s), alphanumeric code(s), ASCII character(s), and/or the like that may describe function(s) or feature(s) associated with the feature release data object or the feature bundle data object. For example, the documentation metadata may include a "what's new" field, which may describe any changes to the product that are associated with the feature. In some examples, the documentation metadata may be in a filled state where the documentation metadata is not blank. For example, a user (such as a content designer) may provide input describing the features associated with the feature release data object in natural language. In some embodiments, the documentation metadata may be in an unfilled state or a blank state, which indicates that the documentation metadata is not filled or left blank.

In some examples, the status metadata may describe a status, state, and/or phase associated with the feature release data object or the feature bundle data object. In some embodiments, the status metadata may indicate a current stage of feature release data object in the feature release workflow/lifecycle. In some examples, the status metadata may include text string(s), numerical character(s), alphabetical character(s), alphanumeric code(s), ASCII character(s), and/or the like.

For example, the status metadata may indicate a "launching state," which in turn may indicate that feature(s) (for example, as provided by the feature metadata) associated with the feature release data object or the feature bundle data object are ready or expected to be released (but has not been released or scheduled to be released) to one or more client devices (for example, as part of a feature bundle data object defined herein).

As another example, the status metadata may indicate a "scheduled state," which in turn may indicate that feature(s) (for example, as provided by the feature metadata) associated with the feature release data object or the feature bundle data object is scheduled to be released to one or more client devices (for example, as part of a feature bundle data object defined herein). For example, the status metadata may change from a "launching state" to a "scheduled state" when a feature bundle data object that includes the feature metadata of the feature release data object has been generated (for example, at a feature bundle generation time).

As another example, the status metadata may indicate a "rollout state," which in turn may indicate that feature(s) (for example, as provided by the feature metadata) associated with the feature release data object or the feature bundle data object are being released to one or more client devices (for example, as part of a feature bundle data object defined herein).

As another example, the status metadata may indicate a "tidying state" or "done state," which in turn may indicate that the release of feature(s) (for example, as described by the feature metadata) associated with the feature release data object or the feature bundle data object to one or more client devices (for example, as part of a feature bundle data object defined herein) has been completed.

In some examples, a feature release data object or a feature bundle data object may include "feature toggle metadata." The term "feature toggle metadata" refers to a software segment that may provide a software switch for enabling or disabling one or more features associated with the feature release data object, the feature bundle data object, or a product.

In some embodiments, the feature toggle metadata of a feature release data object may provide one software switch for enabling or disabling one feature described in the feature metadata of the feature release data object or the feature bundle data object. For example, the feature toggle metadata may indicate either an ON state or an OFF state. If the feature toggle metadata indicates the ON state, the feature corresponding to the feature release data object may be enabled, such that one or more client devices may use and reuse the feature, details of which are described herein. If the feature toggle metadata indicates the OFF state, the feature corresponding to the feature release data object may be disabled or revoked, such that one or more client devices may not be able to use or reuse the feature, details of which are described herein.

In some embodiments, the feature toggle metadata of a feature release data object may provide one software switch for enabling or disabling more than one feature (or a group of features) described in the feature metadata of the feature release data object. For example, if the feature toggle metadata indicates the ON state, the group of features may be enabled, similar to those described above. If the feature toggle metadata indicates the OFF state, the group of features may be disabled or revoked, similar to those described above.

In some embodiments, the feature toggle metadata of a feature release data object may provide multiple software switches for enabling or disabling one feature described in the feature metadata of the feature release data object. For example, the feature toggle metadata may provide multiple feature toggles. If all the feature toggles are in the ON state, the feature may be enabled, similar to those described above. If any one of the feature toggles are in the OFF state, the feature may be disabled or revoked, similar to those described above.

Additionally, or alternatively, the feature toggle metadata may be in other forms. For example, the feature toggle metadata may be in the form of a TRUE/FALSE flag value. If the feature toggle metadata indicates a TRUE value, the feature corresponding to the feature toggle metadata may be enabled, similar to those described above where feature toggle metadata indicates an ON state. If the feature toggle metadata indicates a FALSE value, the feature corresponding to the feature toggle metadata may be disabled or revoked, similar to those described above where feature toggle metadata indicates an OFF state.

In some embodiments, a feature release data object or a feature bundle data object may include "product metadata." The term "product metadata" may describe one or more products associated with the feature release data object or the feature bundle data object. For example, the product metadata may indicate that the feature release data object or the feature bundle data object is associated with the Ace software (e.g. the features provided in the feature release data object or the feature bundle data object is for the Ace software). In some embodiments, product metadata may correspond to a product identifier associated with a user profile, details of which are described herein. In some examples, the product metadata may include text string(s), numerical character(s), alphabetical character(s), alphanumeric code(s), ASCII character(s), and/or the like.

In some examples, a feature release data object or a feature bundle data object may include "category metadata." The term "category metadata" may indicate one or more categories of feature(s) (for example, as provided by the feature metadata) associated with the feature release data object or the feature bundle data object. In some examples, the category metadata may include text string(s), numerical character(s), alphabetical character(s), alphanumeric code(s), ASCII character(s), and/or the like. In some embodiments, the category metadata may be set by a user (for example, a developer of the product, the feature release data object, and/or the feature bundle data object).

For example, the category metadata may classify change(s) that feature(s) associated with the feature release data object or the feature bundle data object may bring to the product. In various embodiments of the present disclosure, the category metadata may indicate one or more categories that is chosen from five categories of changes: C1, C2, C3, C4, and C5 (for example, as determined by a developer).

For example, if the category metadata indicates that the feature release data object or the feature bundle data object is associated with a C1 category, the feature release data object or the feature bundle data object is associated with the release of a new product or the discontinuation of an existing product.

If the category metadata indicates that the feature release data object or the feature bundle data object is associated with a C2 category, the feature release data object or the feature bundle data object is associated with the release of feature(s) for a long-term rollout plan. For example, a long-term rollout plan may be implemented when changes are highly impactful and/or where customer usage data and feedback are critical for the success of the feature rollout.

If the category metadata indicates that the feature release data object or the feature bundle data object is associated with a C3 category, the feature release data object or the feature bundle data object is associated with a concept or mental model change. A concept or mental model is an explanation of one's thought process about how something works in the real world. In the context of feature release, a concept or mental model change may affect how end users experience or use a product, such that end users may need to adjust the concept or mental model that they have established for the product. For example, for a product associated with issue tracking in software development, a feature release data object or a feature bundle data object associated with a C3 category may change how the ownership of each tracked issue is assigned, and therefore end users may need to learn a new concept or need to adjust an existing mental model.

If the category metadata indicates that the feature release data object or the feature bundle data object is associated with a C4 category, the feature release data object or the feature bundle data object is associated with consequential, tangible and/or perceptible user interface (UI) change. For example, a feature release data object or a feature bundle data object associated with a C4 category may include UI change(s) such as moving the location of a button, updating the design language, and/or the like.

If the category metadata indicates that the feature release data object or the feature bundle data object is associated with a C5 category, the feature release data object or the feature bundle data object is associated with non-tangible and/or imperceptible user interface UI change. For example, a feature release data object or a feature bundle data object associated with a C5 category may include UI change(s) such as performance improvement, security fixes, and/or the like.

While the above description provides some examples of category metadata, it is noted that the scope of the present disclosure is not limited to the examples above. In some embodiments, category metadata may be in form(s) different from those described above, and/or may comprise one or more additional or alternative categories.

The term "feature bundle notification" refers to an electronic notification that may describe the function(s) associated with feature metadata of the feature bundle data object, and/or the time and/or date for releasing the feature bundle data object to end users associated with a bundle release track subscription, details of which are described herein.

The term "client device" refers to computer hardware and/or software that is configured to access a feature made available by a feature release server. Client devices may include, without limitation, smart phones, tablet computers, laptop computers, wearables, personal computers, enterprise computers, and the like.

A client device may be associated with one or more clients or users. The terms "client" or "user" refer to an individual, group of individuals, business, organization, and the like. Users referred to herein are discussed largely in connection with client device enabled activity for receiving data and information to/from of a feature release server and/or other device(s) associated with the cloud-based computing environment.

The term "client data repository" refers to a location where data associated with one or more clients is stored, accessed, modified and otherwise maintained by the feature release server. The stored data includes information that facilitates the operation of the cloud-based computing environment, the feature release server and/or the one or more client devices. Such information may include, but not limited to, client identifications and/or client profiles, and/or the like. The client data repository may be embodied as a data storage device or devices, as a separate database server or servers, or as a combination of data storage devices and separate database servers. Further, in some examples, the client data repository may be embodied as a distributed repository such that some of the stored data is stored centrally in a location within the cloud-based computing environment and other data is stored in a single remote location or a plurality of remote locations. Alternatively, in some examples, the client data repository may be distributed over a plurality of remote storage locations only.

The terms "client profile," "user profile," "user account," and "user account details" refer to data, files, and other information associated with a user. In some examples, the collection of data items in the client profile may include identifiers, which may be in the form of text string(s), numerical character(s), alphabetical character(s), alphanumeric code(s), ASCII character(s), and/or the like that uniquely identify data and/or information. For example, a user profile may include, but not limited to, a client identifier (or user identifier), an organization identifier, an admin user identifier or a non-admin user identifier, one or more product identifiers, one or more track subscription identifiers, and/or the like.

The term "client identifier" or "user identifier" refer to an identifier that uniquely identifies information stored in a cloud-based computing environment that is related to a client. For example, a user identifier may comprise a username, a user email address, a user ID number, and/or the like. In some embodiments, the user identifier may be in the form of text string(s), numerical character(s), alphabetical character(s), alphanumeric code(s), ASCII character(s), and/or the like.

The term "organization identifier" refers to an identifier that uniquely identifies an organization associated with the cloud-based computing environment. For example, various organizations (such as Advent, Beta Corporation, etc.) may have access to the cloud-based computing environment, and the cloud-based computing environment may assign an identifier for each organization (for example, by the feature release server). In some embodiments, the organization identifier may be in the form of text string(s), numerical character(s), alphabetical character(s), alphanumeric code(s), ASCII character(s), and/or the like. In some embodiments, a client profile may comprise an organization identifier of an organization if the client is an employee of the organization. For example, if Alice is an employee of the Advent, then Alice's client profile may comprise the organization identifier for Advent.

As described above, an organization may include one or more "administrator users" or "admin users," which refer to a user or client associated with the organization who has authority to manage computing devices and associated resources of (and make decisions on behalf of) other non-administrator users (or non-admin users) of the organization regarding various interactions associated with the cloud-based computing environment (including interactions with the feature release server). In contrast, "non-administrator users" or "non-admin users" refer to a client of the organization who does not have the authority to manage the computing devices and associated resources of other users in the organization.

For example, an admin user may have the authority to review/approve upcoming features to be released to a computing device associated with a non-admin user, details of which are described herein. As another example, an admin user may instruct the feature release sever to subscribe one or more computing devices associated with non-admin users of the same organization to one or more release tracks, details of which are described herein.

The term "admin user identifier" refers to an identifier that indicates a client is an admin user of an organization. The term "non-admin user identifier" refers to an identifier that indicates a client is a non-admin user of an organization. For example, the client profile of an admin user Alice may comprise an admin user identifier. The client profile of a non-admin user Brandon may comprise a non-admin user identifier.

In the present disclosure, the terms "admin client device," "admin user device," or "admin device" refer to a client device associated with an admin user. For example, an admin client device may be associated with a client profile that comprises an admin user identifier. The terms "non-admin client device," "non-admin user device," or "non-admin device" refer to a client device associated with a non-admin user. For example, a non-admin client device may be associated with a client profile that comprises a non-admin user identifier.

The term "product identifier" refers to an identifier that indicates one or more products associated with a user, including, but not limited to, software applications or services that a user has installed on his or her computing devices or subscribed to. For example, a user Alice may install the software application Ace on her computing device. In this example, the user profile of Alice may include a product identifier corresponds to the software application Ace, indicating an association between the software application Ace and Alice's computing device. In some embodiments, the product identifier may be in the form of text string(s), numerical character(s), alphabetical character(s), alphanumeric code(s), ASCII character(s), and/or the like.

The term "track subscription identifier" refers to a data field that indicates a data association, linkage or connection between a user profile and a track subscription. As described above, a user profile may include one or more product identifiers. As such, a track subscription identifier may indicate a data association, linkage or connection that is between a product identifier in a client profile and a track subscription. In some embodiments, the track subscription identifier may include text string(s), numerical character(s), alphabetical character(s), alphanumeric code(s), ASCII character(s), and/or the like.

In the present disclosure, the term "track subscription" refers to a data object that provides a set of data management protocols or policies defining time, manner, and/or mechanism for transmitting features associated with a product to one or more client devices. Such data management protocols or policies may be referred to as "feature release frameworks" or "feature release tracks." In some embodiments, data objects that provide track subscriptions may be stored in a feature release platform or a feature release data repository (for example, the feature release platform 105 or the feature release data repository 107 in connection with FIG. 1 as described in detail herein).

In some examples, a feature release platform and/or a feature release server may provide one or more options of track subscriptions, and each option may provide a different set of data management protocols or policies that define time, manner, and/or mechanism for transmitting features associated with the one or more products to one or more client devices. For example, an option for track subscription may be a "scheduled release track subscription" as described in detail herein. Additionally, or alternatively, an option for track subscription may be a "continuous release track subscription" as described in detail herein. Additionally, or alternatively, an option for track subscription may be a "preview track subscription" as described in detail herein. Additionally, or alternatively, a feature release platform and/or a feature release server may provide other options.

In some examples, a user may select or "subscribe" a product (for example, the software application Ace) to a track subscription through user input via a client device to the feature release server. For example, a client may provide user input to a client device that is in electronic communication with a feature release sever, and the user input may indicate a request to associate one or more products (for example, the software application Ace) with a track subscription (for example, the scheduled release track subscription). The client device may generate a track subscription request based on the user input, and the track subscription request may be transmitted to the feature release server. Subsequent to receiving the release track subscription request, the feature release sever may update the track subscription identifier of the user profile to indicate a track subscription of the product based on the release track subscription request. Subsequent to the user profile being updated, the feature release server may transmit features associated with the product to the client device associated with the user profile based on the data management protocols or policies as defined by the corresponding track subscription.

As an example, a track subscription request may indicate a user's request to associate a product with a "scheduled release track subscription." The term "scheduled release track subscription" refers to a type of track subscription that may provide data management protocols or policies for transmitting or releasing features of a product to client device(s) on a scheduled basis. For example, the scheduled release track subscription may define that features are to be released in the form of feature bundle data objects. The feature bundle data objects may be generated by the feature release server at a feature bundle generation time, and may be released by the feature release server at a feature bundle release time.

In some embodiments, the feature release server may set multiple feature bundle generation times based on a predetermined time interval. For example, the feature release server may set two weeks between each feature bundle generation time. In other words, a feature bundle may be created every two weeks. As an example, a previous feature bundle generation time may be October 9 and the next feature bundle generation time may be October 23. In some embodiments, the time interval between feature bundle generation time may be other length.

In some embodiments, the feature release server may set a feature bundle release time after a predetermined time interval subsequent to a feature bundle generation time. For example, the feature release server may set the feature bundle release time fifteen days after the feature bundle generation time. In some embodiments, the feature release server may set multiple feature bundle generation times based on a predetermined time interval. Continuing from the example above, the feature release server may set the feature bundle release time for the feature bundle data object generated on October 9 to be October 24. The feature release server may set the feature bundle release time for the feature bundle data object generated on October 23 to be November 7. In some embodiments, by setting a time interval between the feature bundle generation time and the feature bundle release time, the processing circuitry may transmit the feature bundle data object to one or more users (for example, admin users) associated with a preview track subscription during the time interval and prior to the feature bundle release time, such that these users can provide feedback on the feature bundle data object, details of which are described herein.

In some embodiments, the time interval between a feature bundle generation time and a feature bundle release time, the time interval between feature bundle generation times, and/or the time interval between feature bundle release times, may be other length.

In some embodiments, the feature bundle data object may be gradually released to users associated with a scheduled release track subscription. For example, the feature bundle data object may be released to a predetermined percentage (for example, one third) of users associated with a scheduled release track subscription on the feature bundle release time, a predetermined percentage (for example, one third) of users associated with a scheduled release track subscription one day after the feature bundle release time, a predetermined percentage (for example, one third) of users associated with a scheduled release track subscription two days after the feature bundle release time, and/or the like until the feature bundle data object is released to all users associated with a scheduled release track subscription.

For example, a user Alice may select scheduled release track subscription for the software application Ace. In this example, the feature release server may release new features of the software application Ace to Alice's computing device every two weeks, each time in the form of a feature bundle data object.

As a more specific example, Alice may select scheduled release track subscription for software application Ace on October 28. The feature release server may determine that a previous feature bundle release time for releasing new features of the software application Ace to end users is October 24, and a subsequent feature bundle release time for releasing new features of the software application Ace to end users is November 7 (i.e. every two weeks). The feature release server may release new features of the software application Ace to Alice's computing device in the form of a feature bundle data object beginning on November 7th, and continue releasing new features every two weeks to Alice's computing device, each time in the form of a feature bundle data object.

As an example, a track subscription request may indicate a user's request to associate a product with a "continuous release track subscription." The term "continuous release track subscription" refers to a type of track subscription that may provide data management protocols or policies for transmitting or releasing features of a product to client device(s) continuously and/or not based on a predetermined schedule.

For example, when a software developer is ready to release a new feature (e.g. as described in the feature metadata of a feature release data object), the software developer may set the feature toggle metadata of the feature release data object to indicate an ON state, and the feature release server may release feature metadata of the feature release data object to one or more client devices associated with the continuous release track subscription for the product, details of which are described herein. In some examples, the feature release server may add a "segment rule" to a feature release data object after the feature toggle metadata is changed from the OFF state to the ON state (i.e. indicating that the developer is ready to release said feature to end users). The term "segment rule" refers to an electronic indication that a feature release data object is ready to be released (and has not been completely released) to client device(s) associated with the continuous release track subscription, details of which are described herein.

As an example, the track subscription request may indicate a user's request to associate a product with a "preview track subscription." The term "preview track subscription" refers to a type of track subscription that may provide data management protocols or policies for transmitting or releasing features of a product to client device(s) in a sandbox environment (for example, a testing environment that isolates new features), such that ends users may test the features of the product safely.

For example, if the track subscription identifier of a user profile indicates a track subscription of a product is preview track subscription, the feature release server may transmit features of the product (for example, in the form of a feature bundle data object) to a client device (that is associated with the user profile), and a user may test the feature on the client device prior to the feature is released to other client devices associated with a scheduled release track subscription or a continuous release track subscription. In some embodiments, the preview track subscription may provide admin user(s) of an organization group at least some control on the feature release to client devices associated with other non-admin user(s) of the same organization group.

For example, a user Alice may be an admin user of Advent, and she may manage computing devices of other end users of Advent (for example, a non-admin user Brandon who uses the software application Ace and is associated with scheduled release track subscription). Once Alice is subscribed to the preview track subscription for the software application Ace, the client device associated with Alice may receive feature bundle data object from a feature release server for review and testing prior to the feature bundle data object is released to client devices associated with non-admin users such as Brandon. After receiving the feature bundle data object on the client device, Alice may test the feature bundle data object. If Alice approves the feature bundle data object, Alice may provide user input to the client device and the client device may transmit an approval indication to the feature release server based on the user input. If Alice does not approve the feature bundle data object, Alice may provide user input to the client device and the client device may transmit a denial indication to the feature release server based on the user input. In some embodiments, Alice may request one or more changes to the feature bundle data object, additional details of which are described in connection with at least FIG. 10.

The term "rollback request" refers to an electronic request to turn off, undo, revoke, cancel, and/or rescind one or more features associated with a product. For example, a computing device (such as a client device) may generate a rollback request for a feature and may transmit the rollback request to the feature release server. Based on the rollback request, the feature release server may disable the feature for the client device, details of which are described herein.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a feature release server), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example cloud-based computing environment 100 within which embodiments of the present disclosure may operate. In the example shown in FIG. 1, the cloud-based computing environment 100 may comprise a feature release platform 105 in electronic communication with organization groups (such as, but not limited to, organization group 113, organization group 115, . . . ).

In some embodiments, the feature release platform 105 comprises a server (such as a feature release server 109) in electronic communication with one or more data repositories (such as the feature release data repository 107 and the client data repository 111).

As defined above, the feature release server 109 may comprise software components and associated hardware components that are configured to manage the release of feature(s) and/or feature bundle data objects(s) associated with one or more products in the cloud-based computing environment 100.

In some embodiments, the feature release server 109 may generate one or more feature bundle data objects for a product based on one or more feature release data objects stored in the feature release data repository 107. In some embodiments, the feature release data repository 107 may be embodied as a data storage device such as a Network Attached Storage (NAS) device or devices, or as a separate database server or servers.

In some embodiments, the feature release server 109 may identify client devices that are associated with a scheduled release track subscription for receiving feature bundle data objects based at least in part on client profiles stored in the client data repository 111. In some embodiments, the client data repository 111 may be embodied as a data storage device such as a Network Attached Storage (NAS) device or devices, or as a separate database server or servers.

As an example, the feature release server 109 may generate a feature bundle data object for a software application Ace, which may include feature metadata that may define new features for Ace (for example, those developed by a software developer for Ace and stored in the feature release data repository 107). The feature release server 109 may filter user profiles associated with client devices based on their product identifiers indicating software application Ace and track subscription identifiers indicating a scheduled release track subscription. The feature release server 109 may release the feature bundle data object for Ace to these client devices at a scheduled feature bundle release time of the scheduled release track subscription, details of which are described herein.

In some embodiments, the feature release platform 105 (including the feature release server 109) may be in electronic communication with one or more client devices 101A, 101B, 101C, 101D, 101E, 101F . . . via a communication network 103. For example, the communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include an 802.11, 802.16, 802.20, and/or WiMax network. Further, the communication network 103 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the feature release platform 105. In some embodiments, the protocol is a custom protocol of JSON objects sent via a websocket channel. In some embodiments, the protocol is JSON over RPC, JSON over REST/HTTP, and the like.

In some embodiments, the client devices 101A, 101B, 101C, 101D, 101E, 101F . . . may be computing devices as described herein. For example, the client devices 101A, 101B, 101C, 101D, 101E, 101F . . . may include desktop computers, laptop computers, smartphones, netbooks, tablet computers, wearables, and the like.

In the example shown in FIG. 1, the client devices 101A, 101B, 101C, 101D, 101E, 101F may be grouped based on the organization that is associated with each client device. As described above, each client device may be associated with a client profile that includes a user identifier and an organization identifier, which may indicate the corresponding user and the user's organization associated with the client device. For example, the client devices 101A, 101B, and 101C are associated with the organization group 113, while the client devices 101D, 101E, and 101F are associated with the organization group 115. In some embodiments, each organization group may include one or more devices in communication with one another.

In some embodiments, each organization group may include one or more client devices that are admin devices, and one or more client devices that are non-admin devices. For example, the client device 101A may be an admin device that is associated with a client profile including an admin user identifier of the organization group 113, and the client devices 101B and 101C may be non-admin devices that are associated with client profiles that include non-admin user identifiers of organization group 113. Similarly, the client device 101D may be an admin device that is associated with a client profile indicating an admin user identifier of the organization group 115, and the client devices 101E and 101F may be non-admin devices that are associated with client profiles including non-admin user identifiers of the organization group 115. The organization group 113 and the organization group 115 may be associated with different organizations.

As described above, an admin user of an organization may manage and/or make changes to non-admin users' computing devices within the same organization. Continuing from the example above, the admin user associated with client device 101A may manage and/or make changes to track subscriptions of client devices 101B and 101C, which are associated with non-admin users of the same organization group 113 as the admin user. The admin user of client device 101A may not be able to manage or make changes to track subscriptions of client devices 101E and 101F because they are associated with a different organization group 115 than the organization group 113 that the client device 101A is associated with.

In various embodiments of the present disclosure, data retention polices associated with products and features (including, but not limited to, feature bundle data objects) may be managed through the feature release server 109 via the communication network 103. For example, the feature release server 109 may control of the release of feature bundle data objects to client devices among different organizations and/or organization groups (for example, client devices 101A, 101B, and 101C associated with the organization group 113, client devices 101D, 101E, and 101F associated with the organization group 115), details of which are described herein.

It is noted that various components of the cloud-based computing environment 100 may leverage the same computer or computing apparatus to perform various operations. For example, various components of the feature release server 109, the feature release data repository 107, and/or the client data repository 111 may leverage the same computer or computing apparatus to perform various operations.

Example Apparatus for Implementing Embodiments of the Present Disclosure

The feature release server 109 of FIG. 1 may be embodied by one or more computing systems, such as apparatus 200 shown in FIG. 2. The apparatus 200 may include a processor 202, a memory 204, an input/output circuitry 206, a communications circuitry 208, and a feature release circuitry 210. The apparatus 200 may be configured to execute the operations described above with respect to FIG. 1 and below with respect to FIGS. 4-12. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some examples, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some examples, the processor 202 may be configured to execute instructions stored in the memory 204 or otherwise accessible to the processor 202. In some examples, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include the input/output circuitry 206 that may, in turn, be in communication with the processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network (such as the communication network 103 as shown in FIG. 1). For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

The feature release circuitry 210 includes hardware configured to support various functionalities of a feature release server, details of which are described hereinafter. The feature release circuitry 210 may utilize processing circuitry, such as the processor 202, to perform these actions. In some embodiments, the feature release circuitry 210 may include a separate processor, specially configured Field Programmable Gate Array (FPGA), or Application Specific Integrated Circuit (ASIC). The feature release circuitry 210 may be implemented using hardware components of the apparatus configured by either hardware or software for implementing the functions described herein.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

The client devices 101A, 101B, 101C, 101D, 101E, 101F . . . of FIG. 1 may include one or more computing systems, such as the apparatus 300 shown in FIG. 3. The apparatus 300 may include a processor 301, a memory 303, an input/output circuitry 307, a communications circuitry 305, an input/output circuitry 307, and/or a display 309. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

As described above, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 301 may provide processing functionality, the memory 303 may provide storage functionality, the communications circuitry 305 may provide network interface functionality, and the like.

In some embodiments, the processor 301 (and/or co-processor or any other processing circuitry assisting or otherwise associated with the processor) may be in communication with the memory 303 via a bus for passing information among components of the apparatus. The memory 303 may be non-transitory and may include, for example, one or more volatile and/or non-volatile memories. In other words, for example, the memory 303 may be an electronic storage device (e.g., a computer readable storage medium). The memory 303 may be configured to store information, data, content, applications, instructions, or the like, for enabling the apparatus 300 to carry out various functions in accordance with example embodiments of the present disclosure.

The processor 301 may be embodied in a number of different ways and may, for example, include one or more processing devices configured to perform independently. Additionally, or alternatively, the processor 301 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 301 may be configured to execute instructions stored in the memory 303 or otherwise accessible to the processor. Alternatively, or additionally, the processor 301 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor to perform the algorithms and/or operations described herein when the instructions are executed.

In some embodiments, the apparatus 300 may include the input/output circuitry 307 that may, in turn, be in communication with the processor 301 to provide output to the user and, in some embodiments, to receive an indication of a user input. The input/output circuitry 307 may comprise an interface, a mobile application, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 303, and/or the like).

In some embodiments, the apparatus 300 may include the display 309 that may, in turn, be in communication with the processor 301 to display renderings of user interfaces. In various examples of the present disclosure, the display 309 may include a liquid crystal display (LCD), a light-emitting diode (LED) display, a plasma (PDP) display, a quantum dot (QLED) display, and/or the like.

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network. For example, the communications circuitry 305 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Methods for Implementing Embodiments of the Present Disclosure

Various example methods described herein, including, for example, example methods as shown in FIGS. 4-12, may improve feature release management of a feature release server.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 4-12 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Feature Bundle Data Object

Referring now to FIG. 4, an example method 400 is illustrated. In particular, the example method 400 illustrates examples of generating feature bundle data object in accordance with example embodiments of the present disclosure.

As shown in FIG. 4, the example method 400 starts at block 402 and then proceeds to step/operation 404. At step/operation 404, a processing circuitry (such as the processor of the feature release server 109 described above in connection with FIG. 1 and FIG. 2) may retrieve feature release data objects.

In some embodiments, the processing circuitry may retrieve feature release data objects from a feature release data repository, such as the feature release data repository 107 described above in connection with FIG. 1. In some embodiments, each of the feature release data objects may comprise feature metadata and release metadata corresponding to the feature metadata, as defined above.

In some embodiments, the retrieval of the feature release data objects may be based on product metadata associated with these feature release data objects (i.e., retrieving feature release data objects that are associated with the same product).

For example, developers of a software application Ace may use computing devices to generate and store one or more feature release data objects in the feature release data repository 107, where each of the one or more feature release data object may represent one or more new features associated with Ace that are to be released to end users of Ace. In this example, each of the one or more feature release data objects may comprise feature metadata (which may provide the one or more new features associated with Ace) and release metadata corresponding to the feature metadata (which may indicate when the new feature can be released to the end users as set by the developers).

Subsequent to step/operation 404, the method 400 proceeds to step/operation 406. At step/operation 406, a processing circuitry (such as the processor of the feature release server 109 described above in connection with FIG. 1 and FIG. 2) may select a subset of the feature release data objects.

In some embodiments, the subset of the feature release data objects may comprise one or more feature release data objects from those retrieved at step/operation 404 that meet one or more criteria or conditions. For example, the processing circuitry may select a subset of the feature release data objects based at least in part on release metadata of each feature release data object in the subset of the feature release data objects indicating a release time between a previous feature bundle generation time and a current time. In this example, the previous feature bundle generation time is associated with a scheduled release track subscription.

Continuing from the example above, the processing circuitry may analyze release metadata of the feature release data objects associated with the software application Ace, and determine a release time of each feature release data object as indicated by the release metadata. For example, the release metadata of an example feature release data object X may indicate a release time of Aug. 5, 2020. As described above, an example scheduled release track subscription may provide a feature release framework where bundled features of a product are generated and released to client device(s) on a scheduled basis. As an example, a previous feature bundle generation time of the scheduled release track subscription associated with Ace may be Aug. 1, 2020, and a current time may be Aug. 15, 2020. Because Aug. 5, 2020 (the release time indicated by the release metadata of the feature release data object X) falls between Aug. 1, 2020 (the previous feature bundle generation time) and Aug. 15, 2020 (the current time), the processing circuitry may select the feature release data object X for the subset of feature release data objects, additional details of which are described in connection with at least FIG. 5.

While the description above provides an example criteria of selecting the subset of feature release data objects, it is noted that the scope of the present disclosure is not limited to the description above. In some examples, the processing circuitry may select the subset of feature release data objects based on one or more other criteria and/or conditions including, but not limited to, those described herein in connection with at least FIG. 5, FIG. 6, FIG. 7, and FIG. 8.

Subsequent to step/operation 406, the method 400 proceeds to step/operation 408. At step/operation 408, a processing circuitry (such as the processor of the feature release server 109 described above in connection with FIG. 1 and FIG. 2) may generate a feature bundle data object.

In some embodiments, the processing circuitry may generate a feature bundle data object based at least in part on feature metadata of each feature release data object in the subset of the feature release data objects. For example, the processing circuitry may combine the feature metadata of these feature release data objects in the subset to generate the feature bundle data object. In some embodiments, the processing circuitry may generate the feature bundle data object at a feature bundle generation time.

Continuing from the example above, the processing circuitry may determine that feature release data object X, feature release data object Y, and feature release data object Z satisfy the applicable conditions/criteria and are selected to for the subset of the feature release data objects. The processing circuitry may generate a combined feature metadata based on the feature metadata of feature release data object X, the feature metadata of feature release data object Y, and the feature metadata of feature release data object Z. The processing circuitry may generate a feature bundle data object based on the combined feature metadata. In other words, the feature bundle data object may comprise features from feature release data object X, feature release data object Y and feature release data object Z.

Subsequent to step/operation 408, the method 400 proceeds to step/operation 410. At step/operation 410, a processing circuitry (such as the processor of the feature release server 109 described above in connection with FIG. 1 and FIG. 2) may transmit the feature bundle data object to a client device.

In some embodiments, the processing circuitry may transmit the feature release data object to a client device associated with the scheduled release track subscription. For example, the processing circuitry may determine that one or more client devices are associated with the scheduled release track subscription for the product. For example, the processing circuitry may retrieve user profiles stored in the client data repository 111, and determine one or more client devices as being associated with the scheduled release track subscription for the product based on the product identifiers and/or the track subscription identifiers associated with the user profiles.

In some embodiments, the processing circuitry may transmit the feature bundle data object to the client device at a subsequent feature bundle release time as defined by the scheduled release track subscription.

Continuing from the above example, the processing circuitry may retrieve client profiles from the client data repository 111, and determine that the client profile of end user Alice indicates that software application Ace is installed on Alice's computing device, and that Alice has subscribed to the scheduled release track subscription. Based on the determination above, the processing circuitry may transmit the feature bundle data object to Alice's computing device.

While the description above provides an example of automated rollout/release of feature bundle data objects, it is noted that the scope of the present disclosure is not limited to the description above. In some examples, a feature bundle data object may be progressively or gradually rolled out or release to the end users.

For example, at the subsequent feature bundle release time, the processing circuitry may generate and transmit a notification to a user (for example, a developer of the product) that indicates the feature bundle data object is ready to be rolled out or released. The user may choose to roll out the feature bundle data object to a first group of users that subscribe to the scheduled release track subscription within the first 24 hours, roll out the feature bundle data object to a second group of users that subscribe to the scheduled release track subscription within the subsequent 24 hours, and so on. As an example, the feature bundle data object may be transmitted to all users who subscribe to the scheduled release track subscription over 3 days.

In some embodiments, prior to transmitting the feature bundle data object to client devices associated with the scheduled release track subscription, the processing circuitry may transmit the feature bundle data object to one or more client devices (for example, those associated with admin users) that are subscribed to the preview track subscription. For example, subsequent to generating the feature bundle data object, the processing circuitry may transmit the feature bundle data object to one or more client devices associated with admin users prior to the feature bundle release time, details of which are described in connection with at least FIG. 10.

In some embodiments, subsequent to transmitting the feature bundle data object to the client device, the client device may install or execute the feature bundle data object, such that the corresponding product may be updated with the new features from the feature bundle data object.

Referring back to FIG. 4, subsequent to step/operation 410, the method 400 ends at block 412.

Referring now to FIG. 5, FIG. 6, FIG. 7, and FIG. 8, example methods associated with the selecting a subset of the feature release data objects described above in connection with step/operation 406 of FIG. 4 are illustrated. In particular, FIG. 5, FIG. 6 FIG. 7, and FIG. 8 illustrate example criteria/conditions for selecting the subset of the feature release data objects.

Referring now to FIG. 5, an example method 500 is illustrated. In the particular, the example method 500 may start at block A from step/operation 406 of FIG. 4.

As shown in FIG. 5, subsequent to block A, the method 500 proceeds to step/operation 501. At step/operation 501, a processing circuitry (such as the processor of the feature release server 109 described above in connection with FIG. 1 and FIG. 2) may determine the category metadata associated with a feature release data object.

In some embodiments, the feature release data object may be retrieved from a feature release data repository (for example, the feature release data repository 107), similar to those described above in connection with step/operation 404 of FIG. 4.

As described above, the category metadata may indicate one or more categories of feature(s) (for example, as provided by the feature metadata) associated with the feature release data object. As an example, the category metadata may indicate a C2 category.

Subsequent to step/operation 501, the method 500 proceeds to step/operation 503. At step/operation 503, a processing circuitry (such as the processor of the feature release server 109 described above in connection with FIG. 1 and FIG. 2) may determine whether the one or more categories indicated by the category metadata correspond to one or more predetermined categories.

For example, the processing circuitry may retrieve a list of predetermined category or categories. The predetermined category or categories on the list (for example, C3 category and C4 category) may correspond to category or categories of features that are deemed to be suitable for releasing through a scheduled release track subscription. For example, categories of features that may impact the UI or user experience for end users may be deemed as suitable for releasing through a scheduled release track subscription. In some embodiments, the list of predetermined categories (or category) may be provided to a feature release platform (for example, the feature release platform 105 described and illustrated above in connection with FIG. 1) by a user (for example, a user who manages the feature release platform 105). As another example, the list of predetermined category or categories may be programmatically generated.

If, at step/operation 503, the processing circuitry determines that the category (or categories) indicated by the category metadata corresponds to the predetermined category or categories on the list, the method 500 proceeds to step/operation 511. At step/operation 511, a processing circuitry (such as the processor of the feature release server 109 described above in connection with FIG. 1 and FIG. 2) may select the feature release data object for the subset.

Continuing from the example above, if the category metadata of the feature release data object is determined to indicate a C4 category at step/operation 501, and the list of predetermined categories includes C4 category, the processing circuitry may determine that the feature release data object is to be included in the subset. Referring back to FIG. 4, for example, the feature release data object may be selected in or added to the subset of feature release data objects at step/operation 406 of FIG. 4.

While the description above provides an example of determining whether to include a feature release data object in the subset based in part on the category metadata, it is noted that the scope of the present disclosure is not limited to the description above. In some examples, the determination may involve one or more additional or alternative conditions. For example, in response to determining that the category corresponds to a predetermined category, the processing circuitry may also determine whether the feature metadata associated with the feature release data object has been rolled out to a predetermined percentage (for example, 30%) of client devices associated with a continuous release track subscription (details of which are described in connection with at least FIG. 11). If the predetermined percentage is reached (and the category corresponds to a predetermined category), the processing circuitry may include the feature release data object in the subset.

Referring back to FIG. 5, if, at step/operation 503, the processing circuitry determines that the category (or categories) indicated by the category metadata does not correspond to the predetermined category or categories on the list, the method 500 proceeds to step/operation 505.

Continuing from the example above, if the category metadata of the feature release data object is determined to indicate a C1 category at step/operation 501, and the list of predetermined categories includes C3 category and C4 category, the processing circuitry may determine that the category (or categories) indicated by the category metadata does not correspond to the predetermined category or categories on the list.

At step/operation 505, a processing circuitry (such as the processor of the feature release server 109 described above in connection with FIG. 1 and FIG. 2) may determine release metadata of a feature release data object.

As described above, the release metadata may describe a release time for enabling the client devices to receive a feature (i.e. when the feature will be released to the end user). As an example, the release time indicated by the release metadata may be Aug. 5, 2020.

Subsequent to step/operation 505, the method 500 proceeds to step/operation 507. At step/operation 507, a processing circuitry (such as the processor of the feature release server 109 described above in connection with FIG. 1 and FIG. 2) may determine whether the release time is after a previous feature bundle generation time.

As descried above, the previous feature bundle generation time may be associated with and defined by a scheduled release track subscription. The previous feature bundle generation time may indicate when a last feature bundle data object associated with the product was generated.

If, at step/operation 507, the processing circuitry determines that release time is not after a previous feature bundle generation time, the method 500 proceeds to step/operation 513. At step/operation 513, a processing circuitry (such as the processor of the feature release server 109 described above in connection with FIG. 1 and FIG. 2) may generate a notification.

For example, the processing circuitry may generate an electronic notification to a computing device associated with the developer of the product that the release time falls before the previous feature bundle generation time. In other words, the last feature bundle data object did not include features associated with feature release data object retrieved by the processing circuitry. The software developer may then choose to, for example, remove the feature release data object from the repository or update the release metadata to indicate a new release date.

Continuing from the example above, if the previous feature bundle generation time is Aug. 6, 2020 (and the release time of the feature release data object set by the developer is Aug. 5, 2020), the processing circuitry may generate a notification to a client device associated with the developer as described above.

Subsequent to step/operation 513, the method 500 proceeds to step/operation 515. At step/operation 515, a processing circuitry (such as the processor of the feature release server 109 described above in connection with FIG. 1 and FIG. 2) may forgo selecting the feature release data object for the subset of feature release data objects. Referring back to FIG. 4, for example, the feature release data object may not be selected in or added to the subset of feature release data objects at step/operation 406 of FIG. 4.

Referring back to step/operation 507 of FIG. 5, if the processing circuitry determines that release time is after a previous feature bundle generation time, the method 500 proceeds to step/operation 509. At step/operation 509, a processing circuitry (such as the processor of the feature release server 109 described above in connection with FIG. 1 and FIG. 2) may determine whether the release time is before the current time.

In some embodiments, the current time may be determined by the feature release server based on a system clock.

If, at step/operation 509, the processing circuitry determines that the release time is not before the current time, the method 500 proceeds to step/operation 515. At step/operation 515, a processing circuitry (such as the processor of the feature release server 109 described above in connection with FIG. 1 and FIG. 2) may forgo selecting the feature release data object for the subset, similar to those described above.

Continuing from the example above, if the current time is Aug. 4, 2020 (and the release time of the feature release data object set by the developer is Aug. 5, 2020), the processing circuitry may determine that the feature release data object is not to be included in the sub set.

If, at step/operation 509, the processing circuitry determines that the release time is before the current time, the method 500 proceeds to step/operation 511. At step/operation 511, a processing circuitry (such as the processor of the feature release server 109 described above in connection with FIG. 1 and FIG. 2) may select the feature release data object for the subset.

Continuing from the example above, if the current time is Aug. 15, 2020 (and the release time of the feature release data object set by the developer is Aug. 5, 2020), the processing circuitry may determine that the feature release data object is to be included in the subset. Referring back to FIG. 4, for example, the feature release data object may be selected in or added to the subset of feature release data objects at step/operation 406 of FIG. 4.

As shown in FIG. 5, subsequent to step/operation 511 and step/operation 515, the example method 500 may proceed to block B, which returns back to step/operation 406 of FIG. 4.

Referring now to FIG. 6, an example method 600 is illustrated. In the particular, the example method 600 may start at block A from step/operation 406 of FIG. 4.

As shown in FIG. 6, subsequent to block A, the method 600 proceeds to step/operation 602. At step/operation 602, a processing circuitry (such as the processor of the feature release server 109 described above in connection with FIG. 1 and FIG. 2) may determine status metadata of a feature release data object.

In some embodiments, the feature release data object may be retrieved from a feature release data repository (for example, the feature release data repository 107), similar to those described above in connection with step/operation 404 of FIG. 4.

As described above, the status metadata may describe a state or status associated with the feature release data object. Example states may include, but not limited to, a launching state, a scheduled state, a rollout state, and a tidying state, as described above.

Subsequent to step/operation 602, the method 600 proceeds to step/operation 604. At step/operation 604, a processing circuitry (such as the processor of the feature release server 109 described above in connection with FIG. 1 and FIG. 2) may determine whether the status metadata indicates a launching state.

As described above, the "launching state" indicates that that feature(s) associated with the feature release data object (for example, as described by the feature metadata) are expected or ready to be released (but has not been released or scheduled to be released) to one or more client devices.

If, at step/operation 604, the processing circuitry determines that the status metadata indicates a launching state, the method 600 proceeds to step/operation 606. At step/operation 606, a processing circuitry (such as the processor of the feature release server 109 described above in connection with FIG. 1 and FIG. 2) may select the feature release data object for the subset, similar to those described above in connection with step/operation 511 of FIG. 5.

As such, the processing circuitry may select the subset of the feature release data objects based at least in part on status metadata of each feature release data object in the subset of the feature release data objects indicating a launching state.

If, at step/operation 604, the processing circuitry determines that the status metadata does not indicate a launching state, the method 600 proceeds to step/operation 608. At step/operation 608, a processing circuitry (such as the processor of the feature release server 109 described above in connection with FIG. 1 and FIG. 2) may forgo selecting the feature release data object for the subset, similar to those described above in connection with step/operation 515 of FIG. 5.

As shown in FIG. 6, subsequent to step/operation 606 and step/operation 608, the example method 600 may proceed to block B, which returns back to step/operation 406 of FIG. 4.

Referring now to FIG. 7, an example method 700 is illustrated. In the particular, the example method 700 may start at block A from step/operation 406 of FIG. 4.

As shown in FIG. 7, subsequent to block A, the method 700 proceeds to step/operation 701. At step/operation 701, a processing circuitry (such as the processor of the feature release server 109 described above in connection with FIG. 1 and FIG. 2) may determine feature toggle metadata of a feature release data object.

In some embodiments, the feature release data object may be retrieved from a feature release data repository (for example, the feature release data repository 107), similar to those described above in connection with step/operation 404 of FIG. 4.

As described above, the feature toggle metadata may provide a software switch for enabling or disabling one or more features associated with a product. For example, when the feature toggle metadata indicates an ON state, the feature corresponding to the feature toggle metadata may be enabled. When the feature toggle metadata indicates an OFF State, the feature corresponding to the feature toggle metadata may not be enabled.

Subsequent to step/operation 701, the method 700 proceeds to step/operation 703. At step/operation 703, a processing circuitry (such as the processor of the feature release server 109 described above in connection with FIG. 1 and FIG. 2) may determine whether the feature toggle metadata indicates an ON state.

If, at step/operation 703, the processing circuitry determines that the feature toggle metadata indicates an ON state, the method 700 proceeds to step/operation 705. At step/operation 705, a processing circuitry (such as the processor of the feature release server 109 described above in connection with FIG. 1 and FIG. 2) may select the feature release data object for the subset, similar to those described above in connection with step/operation 511 of FIG. 5.

As such, the processing circuitry may select the subset of the feature release data objects based at least in part on feature toggle metadata of each feature release data object in the subset of the feature release data objects indicating an ON state.

If, at step/operation 703, the processing circuitry determines that the feature toggle metadata does not indicate an ON state, the method 700 proceeds to step/operation 707. At step/operation 707, a processing circuitry (such as the processor of the feature release server 109 described above in connection with FIG. 1 and FIG. 2) may forgo selecting the feature release data object for the subset, similar to those described above in connection with step/operation 515 of FIG. 5.

As shown in FIG. 7, subsequent to step/operation 705 and step/operation 707, the example method 700 may proceed to block B, which returns back to step/operation 406 of FIG. 4.

Referring now to FIG. 8, an example method 800 is illustrated. In the particular, the example method 800 may start at block A from step/operation 406 of FIG. 4.

As shown in FIG. 8, subsequent to block A, the method 800 proceeds to step/operation 802. At step/operation 802, a processing circuitry (such as the processor of the feature release server 109 described above in connection with FIG. 1 and FIG. 2) may retrieve documentation metadata of a feature release data object.

In some embodiments, the feature release data object may be retrieved from a feature release data repository (for example, the feature release data repository 107), similar to those described above in connection with step/operation 404 of FIG. 4.

As described above, the documentation metadata may include text string(s), numerical character(s), alphabetical character(s), alphanumeric code(s), ASCII character(s), and/or the like that may describe the function or feature associated with the feature release data object. For example, a software developer may provide a description on features associated with the feature release data object for the documentation metadata.

Subsequent to step/operation 802, the method 800 proceeds to step/operation 804. At step/operation 804, a processing circuitry (such as the processor of the feature release server 109 described above in connection with FIG. 1 and FIG. 2) may determine whether the documentation metadata is in a filled state.

For example, the processing circuitry may determine that the documentation metadata is in the filled state when the documentation metadata comprises at least one character. The processing circuitry may determine that the documentation metadata is not in a filled state when it does not comprise any character.

If, at step/operation 804, the processing circuitry determines that the documentation metadata is in a filled state, the method 800 proceeds to step/operation 806. At step/operation 806, a processing circuitry (such as the processor of the feature release server 109 described above in connection with FIG. 1 and FIG. 2) may select the feature release data object for the subset, similar to those described above in connection with step/operation 511 of FIG. 5.

As such, the processing circuitry may select the subset of the feature release data objects based at least in part on documentation metadata of each feature release data object in the subset of the feature release data objects indicating a filled state.

If, at step/operation 804, the processing circuitry determines that the documentation metadata is not in a filled state, the method 800 proceeds to step/operation 808. At step/operation 808, a processing circuitry (such as the processor of the feature release server 109 described above in connection with FIG. 1 and FIG. 2) may forgo selecting the feature release data object for the subset, similar to those described above in connection with step/operation 515 of FIG. 5.

As shown in FIG. 8, subsequent to step/operation 806 and step/operation 808, the example method 800 may proceed to block B, which returns back to step/operation 406 of FIG. 4.

As described above, the example methods illustrated in the FIG. 5, FIG. 6, FIG. 7, and FIG. 8 describe example criteria/conditions for selecting the subset of the feature release data objects in connection with step/operation 406 of FIG. 4. In some embodiments, selecting the subset of the feature release data objects in connection with step/operation 406 of FIG. 4 may be based on one or more of the example criteria/conditions described above in connection with FIG. 5, FIG. 6, FIG. 7, and FIG. 8.

In some examples, selecting the subset of the feature release data objects in connection with step/operation 406 of FIG. 4 may be based on one of methods described above in connection with FIG. 5, FIG. 6, FIG. 7, and FIG. 8. For example, selecting the subset of the feature release data objects in connection with step/operation 406 of FIG. 4 may be based on the example method 500 illustrated and described in connection with FIG. 5. As another example, selecting the subset of the feature release data objects in connection with step/operation 406 of FIG. 4 may be based on the example method 600 illustrated and described in connection with FIG. 6. As another example, selecting the subset of the feature release data objects in connection with step/operation 406 of FIG. 4 may be based on the example method 700 illustrated and described in connection with FIG. 7. As another example, selecting the subset of the feature release data objects in connection with step/operation 406 of FIG. 4 may be based on the example method 800 illustrated and described in connection with FIG. 8.

In some examples, selecting the subset of the feature release data objects in connection with step/operation 406 of FIG. 4 may be based on a combination of methods described above in connection with FIG. 5, FIG. 6, FIG. 7, and FIG. 8. For example, selecting the subset of the feature release data objects in connection with step/operation 406 of FIG. 4 may be based on the example method 500 illustrated and described in connection with FIG. 5 and one or more of example method 600 illustrated and described in connection with FIG. 6, example method 700 illustrated and described in connection with FIG. 7, and/or example method 800 illustrated and described in connection with FIG. 8. As another example, selecting the subset of the feature release data objects in connection with step/operation 406 of FIG. 4 may be based on the example method 600 illustrated and described in connection with FIG. 6 and one or more of example method 700 illustrated and described in connection with FIG. 7 and/or example method 800 illustrated and described in connection with FIG. 8. As another example, selecting the subset of the feature release data objects in connection with step/operation 406 of FIG. 4 may be based on the example method 700 illustrated and described in connection with FIG. 7 and example method 800 illustrated and described in connection with FIG. 8.

In some embodiments, selecting the subset of the feature release data objects in connection with step/operation 406 of FIG. 4 may be based on all of methods described above in connection with FIG. 5, FIG. 6, FIG. 7, and FIG. 8. In such embodiments, a feature release data object is selected into the subset if all of the following conditions are met: (1) the release metadata of the feature release data object indicates a feature release time after the previous feature bundle generation time and before a current time, or that the category metadata indicates a predetermined category (as discussed above in connection with FIG. 5), (2) the status metadata of the feature release data object indicates a launching state (as discussed above in connection with FIG. 6), (3) the feature toggle metadata of the feature release data object indicates an ON state (as discussed above in connection with FIG. 7), and (4) the documentation metadata of a feature release data object indicates a filled state (as discussed above in connection with FIG. 8).

Feature Bundle Notification

Referring now to FIG. 9, an example method 900 is illustrated. In particular, the example method 900 illustrates examples of generating feature bundle notification in accordance with example embodiments of the present disclosure.

As shown in FIG. 9, the example method 900 starts at block 901 and then proceeds to step/operation 903. At step/operation 903, a processing circuitry (such as the processor of the feature release server 109 described above in connection with FIG. 1 and FIG. 2) may retrieve feature release data objects. For example, the processing circuitry may retrieve documentation metadata associated with the feature release data objects.

In some embodiments, the feature release data object may be retrieved from a feature release data repository (for example, the feature release data repository 107), similar to those described above in connection with step/operation 404 of FIG. 4.

In some embodiments, the processing circuitry may retrieve documentation metadata associated with the feature release data objects, similar to those described above in connection with step/operation 802 of FIG. 8.

Subsequent to step/operation 903, the method 900 proceeds to step/operation 905. At step/operation 905, a processing circuitry (such as the processor of the feature release server 109 described above in connection with FIG. 1 and FIG. 2) may generate feature bundle notification.

In some embodiments, the processing circuitry may generate a feature bundle notification based at least in part on the documentation metadata of each feature release data object in the subset of the feature release data objects and/or the subsequent feature bundle release time.

For example, the documentation metadata of each feature release data object in the subset of the feature release data objects may describe the features associated with each feature release data object. The processing circuitry may combine these documentation metadata, thereby creating a consolidated documentation metadata for the feature bundle data object that describe all features associated with the feature bundle data object. The processing circuitry may include the consolidated documentation metadata in the notification (for example, rendering the consolidated documentation metadata for display within the notification).

Additionally, or alternatively, the processing circuitry may include the subsequent feature bundle release time in the notification (for example, rendering the subsequent feature bundle release time for display within the notification).

Subsequent to step/operation 905, the method 900 proceeds to step/operation 907. At step/operation 907, a processing circuitry (such as the processor of the feature release server 109 described above in connection with FIG. 1 and FIG. 2) may transmit feature bundle notification to a client device.

In some embodiments, the processing circuitry may transmit the feature bundle notification to the client device prior to the subsequent feature bundle release time, so that the user associated with the client device may be notified before new features from the next feature bundle data object are released. As described above, the notification may include both the consolidated documentation metadata and the subsequent feature bundle release time. As such, the user may be notified of what new features will be released (according to the consolidated documentation metadata of the notification) and when the new features will be released (according to the subsequent feature bundle release time of the notification).

In some embodiments, the feature bundle notification may be transmitted to a client device associated with an admin user, an example of which is described in connection with at least FIG. 10. In some embodiments, the feature bundle notification may be transmitted to a client device associated with a non-admin user.

In some embodiments, the feature bundle notification may be rendered within an electronic communication, such as an email, an electronic message, a push notification, and/or the like. In some embodiments, the feature bundle notification may be rendered within a webpage, website, or a web use interface that is accessible by the user via a client device.

Referring back to FIG. 9, subsequent to step/operation 907, the method 900 ends at block 909.

Referring now to FIG. 10, an example method 1000 is illustrated through an example signal diagram. In particular, the example signal diagram illustrates example data communications between a client device associated with an admin user, the feature release server, and a client device associated with a non-admin user.

The example method 1000 starts at step/operation 1002, where a client device associated with an admin user may transmit a scheduled release track subscription request, which may be received by the feature release server.

In some embodiments, the scheduled release track subscription request may indicate a user's request to subscribe to the scheduled release track subscription for one or more products. For example, the scheduled release track subscription request may indicate a product identifier corresponding to the product.

In some embodiments, an admin user of an organization may request that non-admin users of the organization who use the products to be subscribed to the scheduled release track subscription in the scheduled release track subscription request. In such embodiments, the admin user may be associated with a first organization identifier and a first admin user identifier, and the scheduled release track subscription request may indicate the first organization identifier, For example, an admin user Alice from the Advent may request that all non-admin users who uses the software application Ace to subscribe to the scheduled release track subscription. In this example, Alice may use a client device to transmit the scheduled release track subscription request to the feature release server, and the scheduled release track subscription request may include a product identifier corresponding to Ace and a first organization identifier corresponding to the Advent.

Subsequent to receiving the scheduled release track subscription request, at step/operation 1004, the feature release server may retrieve a user profile associated with a non-admin user of the organization.

In some embodiments, the feature release server may retrieve user profiles from a client data repository (for example, the client data repository 111 described above) based on the organization identifier, the product identifier, and the non-admin user identifier.

Continuing from the example above, the feature release server may filter user profiles from the client data repository 111 based on the organization identifier indicating Advent, the product identifier indicating Ace, and the user profile being associated with the non-admin user identifier. For example, the feature release server may retrieve the user profile of Brandon, who is a non-admin user of the Advent and uses the software application Ace.

Subsequent to retrieving user profile(s), at step/operation 1006, the feature release server may update the user profile.

In some embodiments, the feature release server may update the user profile(s) retrieved at step/operation 1004 to indicate the scheduled release track subscription associated with the product identifier.

Continuing from the example above, the feature release server may update the track subscription identifier corresponding to the product identifier (i.e. for the software application Ace) in Brandon's profile to indicate scheduled release track subscription.

Referring back to FIG. 10, at step/operation 1008, the feature release server may transmit feature bundle notification to the client device associated with the admin user, similar to those described above in connection with FIG. 9.

In some embodiments, the admin device may be subscribed to a preview track subscription, which may allow the admin user of the admin device to preview (for example, test) the feature bundle data object in a sandbox environment. For example, in connection with transmitting the feature bundle notification at step/operation 1008, the feature release server may transmit the feature bundle data object to the client device associated with an admin user.

Continuing from the example above, Alice may subscribe to the preview track subscription for Ace via her client device. As the feature release server generates a feature bundle data object for Ace at a feature bundle generation time (for example, on October 9), the feature release sever may generate and transmit a feature bundle notification (at step/operation 1008), along with the feature bundle data object for Alice to test out (for example, in a sandbox environment) on or shortly after the feature bundle generation time (for example, also on October 9). As described above, there is a time interval between the feature bundle generation time and the feature bundle release time (for example, the feature bundle data object generated on October 9 is scheduled to be released to users associated with the scheduled release track subscription on October 23). In this example, Alice may test the feature bundle data object from October 9 until before October 23.

While the description above provides an example of an admin user testing the feature bundle data object through a preview track subscription, it is noted that the scope of the present disclosure is not limited to the description above. In some examples, an admin user may test the feature bundle data object in a sandbox environment through other type(s) of track subscription(s). For example, an admin user may subscribe to a continuous release track subscription to preview or test feature bundle data objects that are to be released to users who subscribed to a continuous feature release track.

Referring back to FIG. 10, subsequent to (and/or in response to) receiving the feature bundle notification, at step/operation 1010, the client device associated with the admin user may transmit an approval indication to the feature release server.

Continuing from the example above, Alice may review the feature bundle notification and determine that the features to be released are suitable for users in the Advent organization. Alice may transmit the approval indication to the feature release server via her client device indicating her approval of the feature bundle data object, which may trigger the feature release server to transmit the feature bundle data objects in a subsequent step/operation and at the subsequent bundle feature release time.

In some examples, Alice may not approve the feature bundle data object. In such examples, the feature release server may forgo transmitting feature bundle data object in the subsequent step/operation described above.

In some examples, Alice may request that one or more features from the feature bundle data object to be removed by sending a rollback request to feature release server, and the feature release server may conduct one or more operations to remove these features, details of which are described in connection with at least FIG. 12.

Referring back to FIG. 10, subsequent to receiving the approval indication, at step/operation 1012, the feature release server may transmit the feature bundle data object that has been approved by the admin user to client devices associated with the same organization.

In some embodiments, the feature bundle data object may comprise product metadata corresponding to the product identifier associated with the scheduled release track subscription. In other words, the feature bundle data object is for a product that is associated with a scheduled release track subscription.

In some embodiments, the admin user may also subscribe to the scheduled release track subscription. In such examples, the feature bundle data object may be transmitted to client devices associated with the admin user and the client device associated with the non-admin user, as shown in FIG. 10.

Continuing from the example above, the feature release server may transmit the feature bundle data object to a client device associated with the admin user Alice, as well as to the client device associated with non-admin user Brandon, where both Alice and Brandon are associated with the Advent.

Feature Release and Rollback

Referring now to FIG. 11, an example method 1100 is illustrated. In particular, the example method 1100 illustrates examples of handling feature release in accordance with example embodiments of the present disclosure.

As shown in FIG. 11, the example method 1100 starts at block 1101 and then proceeds to step/operation 1103. At step/operation 1103, a processing circuitry (such as the processor of the feature release server 109 described above in connection with FIG. 1 and FIG. 2) may receive input indicating feature metadata and feature toggle metadata. In some embodiments, the feature toggle metadata may correspond to the feature metadata.

For example, the processing circuitry may receive input from a software developer Celia's computing device. The input may be associated with releasing a new feature for the software application Ace. The input may include programming code for the new feature (e.g. feature metadata) and an indication on whether the feature can be enabled (e.g. feature toggle metadata).

Subsequent to step/operation 1103, the method 1100 proceeds to step/operation 1105. At step/operation 1105, a processing circuitry (such as the processor of the feature release server 109 described above in connection with FIG. 1 and FIG. 2) may generate a feature release data object.

In some embodiments, the processing circuitry may generate the feature release data object based at least in part on the feature metadata and the feature toggle metadata received at step/operation 1103. For example, the processing circuitry may assemble or compile the feature release data object in accordance with an assembling or compilation protocol, and may store the feature release data object in a feature release data repository (for example, the feature release data repository 107).

Subsequent to step/operation 1105, the method 1100 proceeds to step/operation 1107. At step/operation 1107, a processing circuitry (such as the processor of the feature release server 109 described above in connection with FIG. 1 and FIG. 2) may determine whether the feature toggle metadata indicates an ON state, similar to step/operation 703 described above in connection with FIG. 7.

If, at step/operation 1107, the processing circuitry determines that feature toggle metadata indicates an ON state, the method 1100 proceeds to step/operation 1109. At step/operation 1109, a processing circuitry (such as the processor of the feature release server 109 described above in connection with FIG. 1 and FIG. 2) may add a segment rule to the feature release data object.

As described above, when the feature toggle metadata indicates an ON state, the feature corresponding to the feature toggle metadata may be enabled. As such, in response to determining that the feature toggle metadata indicates an ON state, the processing circuitry may add the segment rule to the feature release data object to indicate that the feature is ready to be released, at least to users who are subscribed to a continuous release track subscription.

Subsequent to step/operation 1109, the method 1100 proceeds to step/operation 1111. At step/operation 1111, a processing circuitry (such as the processor of the feature release server 109 described above in connection with FIG. 1 and FIG. 2) may transmit the feature metadata of the feature release data object to a client device.

In some embodiments, the processing circuitry may transmit the feature metadata to a client device associated with a continuous release track subscription. As described above, end users who subscribe to the continuous release track subscription may receive new features continuously and not on a scheduled basis.

Subsequent to step/operation 1111, the method 1100 proceeds to step/operation 1113. At step/operation 1113, a processing circuitry (such as the processor of the feature release server 109 described above in connection with FIG. 1 and FIG. 2) may remove the segment rule from the feature release data object.

In some embodiments, removing the segment rule from the feature release data object indicates that the feature metadata has been transmitted to all end users who are subscribed to the continuous release track subscription, and that the feature metadata is ready to be transmitted to end users who subscribe to the scheduled release track subscription as a next step (for example, based on various example methods described herein).

For example, subsequent to the feature metadata has been transmitted to end users who subscribe to the continuous release track subscription, the developer may determine that the feature metadata is ready to be released to end users who subscribe to the scheduled release track subscription. In such an example, the developer may set the release metadata (indicating a release time), and the processing circuitry may include the feature release data object to a feature bundle data object, similar to those described above in connection with at least FIG. 4 to FIG. 8.

Subsequent to step/operation 1113, the example method 1100 ends at block 1115

Referring back to step/operation 1107, if the processing circuitry determines that feature toggle metadata does not indicate an ON state, the method 1100 proceeds to block 1115 and ends, as the processing circuitry determines that the feature is not ready to be released.

Referring now to FIG. 12, an example method 1200 is illustrated. In particular, the example method 1200 illustrates examples of handling rollback requests in accordance with example embodiments of the present disclosure.

As shown in FIG. 12, the example method 1200 starts at block 1202 and then proceeds to step/operation 1204. At step/operation 1204, a processing circuitry (such as the processor of the feature release server 109 described above in connection with FIG. 1 and FIG. 2) may receive a rollback request.

As described above, the rollback request may indicate an electronic request to turn off, undo, revoke, cancel, and/or rescind one or more features associated with a product. In some embodiments, the rollback request may be associated with a feature metadata that provides such feature(s) to be turned off, undo, revoked, canceled, and/or rescinded.

In some embodiments, the rollback request may be received from a client device. For example, the rollback request may be received from a client device of an admin user.

Subsequent to step/operation 1204, the method 1200 proceeds to step/operation 1206. At step/operation 1206, a processing circuitry (such as the processor of the feature release server 109 described above in connection with FIG. 1 and FIG. 2) may determine whether the feature metadata associated with the rollback request is included in one or more feature bundle data objects that have been generated by the feature release server.

For example, the feature release server may traverse feature bundle data objects that have been generated and stored in the feature release data repository 107.

If, at step/operation 1206, the processing circuitry determines that feature metadata associated with the rollback request is not included in one or more feature bundle data objects, the method 1200 proceeds to block 1216 and ends, as the processing circuitry determines that there is no need for rollback for users who subscribe to the scheduled release track because the feature has not been picked up by the processing circuitry for generating the feature bundle data objects.

In some embodiments, the processing circuitry may adjust the feature toggle metadata corresponding to the feature metadata to an OFF state to disable such feature corresponding to the feature metadata. For example, as described above in connection with FIG. 11, feature metadata may be continuously released to client devices that are subscribed to a continuous release track subscription. In such an example, even though the feature bundle data object has not been released to end users who are subscribed a scheduled release track subscription, the feature metadata (for example, as part of a feature release data object) may have already been released to the client devices that are subscribed to a continuous release track subscription. As such, by adjusting the feature toggle metadata corresponding to the feature metadata to an OFF state, the feature is disabled on client devices that are subscribed to a continuous release track subscription.

If, at step/operation 1206, the processing circuitry determines that feature metadata associated with the rollback request is included in one or more feature bundle data objects, the method 1200 proceeds to step/operation 1208. At step/operation 1208, a processing circuitry (such as the processor of the feature release server 109 described above in connection with FIG. 1 and FIG. 2) may determine whether the feature bundle data object has previously been transmitted (for example, to a client device associated with a continuous release track subscription or a scheduled release track subscription).

If, at step/operation 1208, the processing circuitry determines that the feature bundle data object has not previously been transmitted, the method 1200 proceeds to step/operation 1210. At step/operation 1210, a processing circuitry (such as the processor of the feature release server 109 described above in connection with FIG. 1 and FIG. 2) may remove the feature metadata from the feature bundle data object.

In some embodiments, the processing circuitry may retrieve the feature bundle data object, remove the feature metadata from the feature bundle data object, and subsequently store the feature bundle data object in a repository. As such, based on determining that the feature bundle data object comprises the feature metadata associated with the rollback request, the processing circuitry may remove the feature metadata from the feature bundle data object prior to transmitting the feature bundle data object.

In some embodiments, to remove the feature metadata from the feature bundle data object, the processing circuitry may reset the release metadata of the feature release data object that corresponds to the feature metadata. For example, the processing circuitry may set the release time to a time after a current time, therefore removing the feature release data object from the subset of feature release data objects for generating the feature bundle data object, as described above in connection with at least FIG. 5.

In some embodiments, the processing circuitry may adjust the feature toggle metadata corresponding to the feature metadata to an OFF state to disable such feature corresponding to the feature metadata. For example, as described above in connection with FIG. 11, feature metadata may be continuously released to client devices that are subscribed to a continuous release track subscription. In such an example, even though the feature bundle data object has not been released to end users who are subscribed a scheduled release track subscription, the feature metadata (for example, as part of a feature release data object) may have already been released to the client devices that are subscribed to a continuous release track subscription. As such, by adjusting the feature toggle metadata corresponding to the feature metadata to an OFF state, the feature is disabled on client devices that are subscribed to a continuous release track subscription.

Subsequent to step/operation 1210, the method 1200 ends at block 1216.

If, at step/operation 1208, the processing circuitry determines that the feature bundle data object has previously been transmitted, the method 1200 proceeds to step/operation 1212. At step/operation 1212, a processing circuitry (such as the processor of the feature release server 109 described above in connection with FIG. 1 and FIG. 2) may adjust the feature toggle metadata corresponding to the feature metadata to an OFF state to disable such feature.

In some embodiments, by adjusting the feature toggle metadata corresponding to the feature metadata to the OFF state, the feature is disabled on client devices that are subscribed to a continuous release track subscription and client devices that are subscribed to a scheduled release track subscription. In other words, based on determining that the feature bundle data object comprises the feature metadata associated with the rollback request, the processing circuitry may adjust the feature toggle metadata corresponding to the feature metadata to an OFF state subsequent to transmitting the feature bundle data object (which may include subsequent to transmitting the feature bundle data object to client devices associated with the continuous release track subscription and client devices associated with the scheduled release track subscription).

Subsequent to step/operation 1212, the method 1200 proceeds to step/operation 1214. At step/operation 1214, a processing circuitry (such as the processor of the feature release server 109 described above in connection with FIG. 1 and FIG. 2) may generate and transmit a notification to client devices.

In some embodiments, the notification may indicate that the feature has been rolled back in accordance with the rollback request. In some embodiments, the client devices may be associated with the scheduled release track subscription and/or the continuous release track subscription that have previously received the feature bundle data object. In some embodiments, the client devices may be associated with one or more admin users. In some embodiments, the client devices may be associated with one or more non-admin users.

Subsequent to step/operation 1214, the method 1200 ends at block 1216.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device).

Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for managing feature release in a cloud-based computing environment, the apparatus comprising at least one processor and at least one non-transitory memory comprising program code, the at least one non-transitory memory and the program code configured to, with the at least one processor, cause the apparatus to at least:
retrieve feature release data objects from a feature release data repository, each of the feature release data objects comprising feature metadata, category metadata corresponding to the feature metadata, and release metadata corresponding to the feature metadata;
select a subset of the feature release data objects in response to determining that category metadata of each feature release data object in the subset of the feature release data objects indicates a feature category associated with a scheduled release track subscription and that release metadata of each feature release data object in the subset of the feature release data objects indicates a release time subsequent to a previous feature bundle generation time and prior to a current time, the previous feature bundle generation time being associated with the scheduled release track subscription;
generate a feature bundle data object based at least in part on feature metadata of each feature release data object in the subset of the feature release data objects; and
transmit the feature bundle data object to a first client device associated with the scheduled release track subscription at a subsequent feature bundle release time associated with the scheduled release track subscription.

2. The apparatus of claim 1, wherein each of the feature release data objects further comprises status metadata, wherein selecting the subset of the feature release data objects is further based at least in part on status metadata of each feature release data object in the subset of the feature release data objects indicating a launching state.

3. The apparatus of claim 1, wherein each of the feature release data objects further comprises feature toggle metadata, wherein selecting the subset of the feature release data objects is further based at least in part on feature toggle metadata of each feature release data object in the subset of the feature release data objects indicating an ON state.

4. The apparatus of claim 1, wherein each of the feature release data objects further comprises documentation metadata corresponding to the feature metadata.

5. The apparatus of claim 4, wherein selecting the subset of the feature release data objects is further based at least in part on documentation metadata of each feature release data object in the subset of the feature release data objects indicating a filled state.

6. The apparatus of claim 4, wherein, prior to transmitting the feature bundle data object to the first client device, the at least one non-transitory memory and the program code are configured to, with the at least one processor, cause the apparatus to further:
generate a feature bundle notification based at least in part on the subsequent feature bundle release time and the documentation metadata of each feature release data object in the subset of the feature release data objects; and
prior to the subsequent feature bundle release time, transmit the feature bundle notification to the first client device.

7. A computer-implemented method for managing feature release in a cloud-based computing environment, comprising:
retrieving feature release data objects from a feature release data repository, each of the feature release data objects comprising feature metadata, category metadata corresponding to the feature metadata, and release metadata corresponding to the feature metadata;
selecting a subset of the feature release data objects in response to determining that category metadata of each feature release data object in the subset of the feature release data objects indicates a feature category associated with a scheduled release track subscription and that release metadata of each feature release data object in the subset of the feature release data objects indicates a release time subsequent to a previous feature bundle generation time and prior to a current time, the previous feature bundle generation time being associated with the scheduled release track subscription;

generating a feature bundle data object based at least in part on feature metadata of each feature release data object in the subset of the feature release data objects; and transmitting the feature bundle data object to a first client device associated with the scheduled release track subscription at a subsequent feature bundle release time associated with the scheduled release track subscription.

8. The computer-implemented method of claim 7, wherein each of the feature release data objects further comprises status metadata, wherein selecting the subset of the feature release data objects is further based at least in part on status metadata of each feature release data object in the subset of the feature release data objects indicating a launching state.

9. The computer-implemented method of claim 7, wherein each of the feature release data objects further comprises feature toggle metadata, wherein selecting the subset of the feature release data objects is further based at least in part on feature toggle metadata of each feature release data object in the subset of the feature release data objects indicating an ON state.

10. The computer-implemented method of claim 7, wherein each of the feature release data objects further comprises documentation metadata corresponding to the feature metadata.

11. The computer-implemented method of claim 10, wherein selecting the subset of the feature release data objects is further based at least in part on documentation metadata of each feature release data object in the subset of the feature release data objects indicating a filled state.

12. The computer-implemented method of claim 10, wherein, prior to transmitting the feature bundle data object to the first client device, the computer-implemented method further comprises:

generating a feature bundle notification based at least in part on the subsequent feature bundle release time and the documentation metadata of each feature release data object in the subset of the feature release data objects; and prior to the subsequent feature bundle release time, transmitting the feature bundle notification to the first client device.

13. A computer program product for managing feature release in a cloud-based computing environment, the computer program product comprising at least one non-transitory computer-readable storage medium having computer-readable program code portions stored therein, the computer-readable program code portions comprising an executable portion configured to:

retrieve feature release data objects from a feature release data repository, each of the feature release data objects comprising feature metadata, category metadata corresponding to the feature metadata, and release metadata corresponding to the feature metadata;

select a subset of the feature release data objects in response to determining that category metadata of each feature release data object in the subset of the feature release data objects indicates a feature category associated with a scheduled release track subscription and that release metadata of each feature release data object in the subset of the feature release data objects indicates a release time subsequent to a previous feature bundle generation time and prior to a current time, the previous feature bundle generation time being associated with the scheduled release track subscription;

generate a feature bundle data object based at least in part on feature metadata of each feature release data object in the subset of the feature release data objects; and transmit the feature bundle data object to a first client device associated with the scheduled release track subscription at a subsequent feature bundle release time associated with the scheduled release track subscription.

14. The computer program product of claim 13, wherein each of the feature release data objects further comprises status metadata, wherein selecting the subset of the feature release data objects is further based at least in part on status metadata of each feature release data object in the subset of the feature release data objects indicating a launching state.

15. The computer program product of claim 13, wherein each of the feature release data objects further comprises feature toggle metadata, wherein selecting the subset of the feature release data objects is further based at least in part on feature toggle metadata of each feature release data object in the subset of the feature release data objects indicating an ON state.

16. The computer program product of claim 13, wherein each of the feature release data objects further comprises documentation metadata corresponding to the feature metadata.

17. The computer program product of claim 16, wherein selecting the subset of the feature release data objects is further based at least in part on documentation metadata of each feature release data object in the subset of the feature release data objects indicating a filled state.

18. The apparatus of claim 1, wherein the at least one non-transitory memory and the program code are configured to, with the at least one processor, cause the apparatus to:

select a second subset of the feature release data objects in response to determining that release metadata of each feature release data object in the second subset of the feature release data objects indicating a second release time prior to the previous feature bundle generation time;

generate a notification based on the second subset of the feature release data objects; and transmit the notification to the first client device.

19. The computer-implemented method of claim 7, further comprising:

selecting a second subset of the feature release data objects in response to determining that release metadata of each feature release data object in the second subset of the feature release data objects indicating a second release time prior to the previous feature bundle generation time;

generating a notification based on the second subset of the feature release data objects; and transmitting the notification to the first client device.

20. The computer program product of claim 13, wherein the computer-readable program code portions comprise the executable portion configured to:

select a second subset of the feature release data objects in response to determining that release metadata of each feature release data object in the second subset of the feature release data objects indicating a second release time prior to the previous feature bundle generation time;

generate a notification based on the second subset of the feature release data objects; and
transmit the notification to the first client device.

* * * * *